(12) United States Patent
Nallamothu et al.

(10) Patent No.: US 11,991,097 B2
(45) Date of Patent: May 21, 2024

(54) HYBRID DATA PLANE FOR A CONTAINERIZED ROUTER

(71) Applicant: Juniper Networks, Inc., Sunnyvale, CA (US)

(72) Inventors: Vinay K Nallamothu, Sunnyvale, CA (US); Vinod Nair, San Jose, CA (US); Kiran K N, Bangalore (IN); Shailender Sharma, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/813,027

(22) Filed: Jul. 15, 2022

(65) Prior Publication Data

US 2023/0412526 A1 Dec. 21, 2023

Related U.S. Application Data

(60) Provisional application No. 63/366,619, filed on Jun. 17, 2022.

(51) Int. Cl.
*H04L 12/46* (2006.01)
*H04L 45/50* (2022.01)
*H04L 49/00* (2022.01)

(52) U.S. Cl.
CPC .......... *H04L 49/70* (2013.01); *H04L 12/4633* (2013.01); *H04L 45/50* (2013.01)

(58) Field of Classification Search
CPC ...... H04L 12/4633; H04L 45/50; H04L 49/70
See application file for complete search history.

(56) References Cited

U.S. PATENT DOCUMENTS

| 9,571,394 | B1 | 2/2017 | Sivaramakrishnan et al. |
| 10,728,145 | B2 | 7/2020 | Rao et al. |
| 11,233,778 | B2* | 1/2022 | Abraham ............... H04L 45/745 |
| 11,329,966 | B2* | 5/2022 | Abraham ............ H04L 12/4633 |
| 11,563,678 | B1* | 1/2023 | Udupa .................... H04L 45/42 |
| 2020/0314029 | A1 | 10/2020 | Gopinath et al. |
| 2022/0278927 | A1* | 9/2022 | Mariappan .............. H04L 45/02 |
| 2022/0279420 | A1* | 9/2022 | Akkipeddi .............. H04L 45/64 |
| 2022/0279421 | A1* | 9/2022 | Sivakumar .............. H04L 45/04 |
| 2022/0286940 | A1* | 9/2022 | Grewal ................... H04L 45/04 |

FOREIGN PATENT DOCUMENTS

CN 111211999 A 5/2020

OTHER PUBLICATIONS

Kiran KN et al., "Day One: Contrail DPDK vRouter", Juniper Networks, Inc., Jan. 2021, 196 pp.

(Continued)

*Primary Examiner* — Alpus Hsu
(74) *Attorney, Agent, or Firm* — Shumaker & Sieffert, P.A.

(57) ABSTRACT

In general, this disclosure describes techniques for providing a hybrid data plane that can include a kernel-based data plane and a Data Plane Development Kit (DPDK)-based data plane. An example system includes a DPDK-based virtual router configured to send and receive packets via a physical network interface, and a kernel network stack configured to perform tunneling processing for packets destined to a containerized application and received by the DPDK-based virtual router via the physical interface.

20 Claims, 13 Drawing Sheets

(56) References Cited

OTHER PUBLICATIONS

Rosen et al., "BGP/MPLS IP Virtual Private Networks (VPNs)", RFC 4364, Network Working Group of Internet Engineering Task Force, Feb. 2006, 47 pp.
U.S. Appl. No. 17/305,110, filed Jun. 30, 2021, naming inventors Nagaprakash et al.
Arashloo et al., "Public review for A Scalable VPN Gateway for Multi-Tenant Cloud Services", ACM SIGCOMM Computer Communication Review, vol. 48, No. 1, Apr. 27, 2018, pp. 49-55, URL: https://oar.princeton.edu/bitstream/88435/pr14c3h/1/ScalableGatewayMultiTenantCloudServices.pdf.
Extended Search Report from counterpart European Application No. 22215424.7 dated Oct. 19, 2023, 18 pp.
Intel, "Intel® Data Plane Development Kit", Sample Applications User Guide; Document No. 328218-008, Intel Corporation, Jun. 30, 2014, 162 pp.
Rao et al., "Benchmarking Kubernetes Container-Networking for Telco Usecases", 2021 IEEE Global Communications Conference, IEEE, Dec. 7, 2021, pp. 1-7.

\* cited by examiner

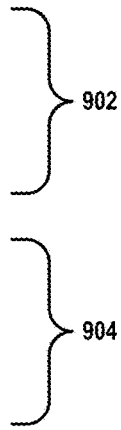

```
apiVersion: v1
kind: Pod
metadata:
  name: odu-pod1
  annotations:
    k8s.v1.cni.cncf.io/networks: |
      [
        {
          "name": "vswitch-pod1-bd100",
          "interface":"net1",
          "cni-args": {
            "mac":"00:11:11:11:60:11",
            "dataplane":"linux"
          }
        },
        {
          "name": "vswitch-pod1-bd200",
          "interface":"net2",
          "cni-args": {
            "mac":"00:11:11:11:60:21",
            "dataplane":"DPDK"
          }
        }
      ]
spec:
  affinity:
    nodeAffinity:
      requiredDuringSchedulingIgnoredDuringExecution:
        nodeSelectorTerms:
        - matchExpressions:
          - key: kubernetes.io/hostname
            operator: In
            values:
            - kind-worker
  containers:
  - name: odu1
    image: localhost:5000/crpd:latest
    imagePullPolicy: Never
    securityContext:
      privileged: false
    env:
    - name: KUBERNETES_POD_UID
      valueFrom:
        fieldRef:
          fieldPath: metadata.uid
    volumeMounts:
    - name: dpdk
      mountPath: /dpdk
      subPathExpr: $(KUBERNETES_POD_UID)
  volumes:
  - name: dpdk
    hostPath:
      path: /var/run/jcnr/containers
```

FIG. 9

HYBRID DATA PLANE FOR A CONTAINERIZED ROUTER

RELATED APPLICATION

This application claims the benefit of U.S. Provisional Application No. 63/366,619, filed Jun. 17, 2022, the entire contents of which is incorporated herein by reference.

TECHNICAL FIELD

The disclosure relates to virtualized computing infrastructure and, more specifically, to a hybrid data plane for containerization platforms.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (e.g., containerized workloads, sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for providing a hybrid data plane for a compute node, the hybrid data plane comprised of two different data planes that each may support different communication protocols. Existing systems typically provide a single data plane, or, if multiple data planes are provided, they are disjoint data planes. A single data plane may not be able to meet the varying needs of containerized applications on a server. For example, some containerized applications—which may be deployed using pods—may require high throughput and low latency that may be provided by a Data Plane Development Kit (DPDK) data plane, while other pods may require encapsulations, services, and/or routing that are not supported by a DPDK data plane. In a disjoint model, a set of the fabric (core facing) interfaces are managed by the kernel data plane and another set are managed by DPDK data plane. In this model, traffic from kernel pod interfaces is intended to be forwarded over kernel core interfaces and traffic from DPDK pods is intended to be forwarded over DPDK fabric interfaces. However, it is very complicated, if not impossible, to achieve this separation for corresponding control plane and routing protocols. Further, there can be no guarantee that inbound or outbound packets will take the interface corresponding to the intended data plane. This can result in inefficient packet handling or even a break down in the data plane. As an example, a compute node implementing a disjoint data plane may have a first port owned by the kernel data plane and a second port owned by the DPDK data plane. Because the compute node cannot typically inform an external node which port to use for communication with pods on the compute node, it is possible for a packet that ought to be processed by the DPDK plane data plane to arrive on an interface that is owned by the kernel (e.g., the first port). When this happens, the kernel must forward the packet to the DPDK data plane, thereby incurring overhead and inefficient processing of the packet. Moreover, the DPDK data plane typically handles network traffic at a much higher rate than the kernel data plane. As a result, the kernel may receive packets meant for the DPDK data plane at a high rate. This can result in significant CPU utilization issues or resource memory issues, which can further result in degradation of overall system performance.

In view of the above, the single data plane or disjoint data planes provided by existing systems may not meet the varying needs of different workloads executed on a server. Further, disjoint data planes can result in inefficient handling of network traffic meant for the DPDK data plane that arrives on the kernel data plane.

The hybrid data plane described herein may support a Cloud Native Router in a manner that provides technical advantages over existing systems. For example, a technical advantage of the hybrid data plane model described herein is that the hybrid data plane can avoid breakdowns or inefficient operation by configuring the DPDK data plane in a compute node to own all of the fabric interfaces. A pod or other workload can be configured to utilize one or both of a kernel data plane and a DPDK data plane that are provided as part of the hybrid data plane. The pod can be configured to use the data plane that is best suited to the pod's communications requirements, i.e., of the containerized applications deployed in that pod. For example, pods that require high throughput and/or low latency can be configured to utilize the DPDK data plane, while pods that require more complex encapsulations not supported by the DPDK data plane can utilize the kernel-based data plane. The kernel data plane can perform the encapsulations, and forward the encapsulated packets to the DPDK data plane for pass through forwarding out an interface owned by the DPDK data plane. Because the DPDK data plane is assigned all of the physical interfaces managed by the Cloud Native Router, incoming packets are received by the DPDK data plane. The DPDK data plane can include logic to determine if an incoming packet is to be processed by the DPDK data plane or transferred to the kernel data plane for decapsulation or other processing not supported by the DPDK data plane.

A hybrid data plane according to the techniques disclosed herein may include a kernel data plane and a DPDK data plane. A pod or other containerized workload may be configured to utilize whichever data plane of the hybrid data plane that best meets its requirements. As an example, a pod requiring high data transfer rates and low latency may be configured to use a DPDK data plane. However, a DPDK data plane does not typically support all of the different types of encapsulations and overlays that a kernel data plane may support, such as IPsec support, SRv6, IP-IP, EVPN-VxLAN, L3VPN over SRv6 etc. Thus, a pod or other container unit that requires such capabilities may be configured to use a kernel data plane. However, it can be difficult for a control plane to efficiently control both a kernel data plane and a DPDK data plane that are on a same compute node.

In some aspects, all of the physical interfaces of a compute node that are managed by a Cloud Native Router are assigned to DPDK virtual routers. Pods that are configured to use DPDK can directly use interfaces provided by the DPDK-enabled virtual routers. Pods that require capabilities that are not supported by the DPDK-enabled virtual routers can be configured to use kernel data plane interfaces. The techniques may involve, in at least some aspects, assigning all of the network interfaces of a server to one or more DPDK-based virtual routers on the server. The DPDK-enabled virtual router can provide data communication and routing functions for pods configured to use DPDK, for example, and pods can benefit from this aspect of the hybrid data plane providing high speed, low latency communication. The techniques may further involve a kernel configured with a network stack to provide capabilities that may be lacking in the DPDK-enabled virtual router. For example, the kernel (or a virtual router configured as a module of the kernel) may provide a data plane that supports IPsec, SRv6, IP-IP, EVPN-VxLAN, L3VPN over SRv6 etc. A pod requiring such support may be configured with a virtual network interface with the kernel to cause the pods to send data to the kernel for processing by the kernel network stack. The kernel is configured to route all traffic to the DPDK-enabled router, which acts as a pass-through for traffic received from the kernel. That is, the DPDK-enabled virtual router performs little to no processing of the packet and transmits the packet through one of the physical interfaces allocated to the DPDK-based virtual router. Thus, the kernel data plane and the DPDK-enabled data plane are combined to form a hybrid data plane.

As noted above, the hybrid data plane may be implemented to support a Cloud Native Router using a container orchestration platform. A container networking interface (CNI) is a networking solution for application containers and is a runtime executable that assists with configuring interfaces between containers and other components of the computing device ("host") hosting the container, which may be a member of a pod. The computing device may be alternatively referred to as a "compute node" or "server". The CNI typically assigns the network address (e.g., IP address) to the network interface and may also add routes relevant for the interface, such as routes for the default gateway and one or more nameservers.

A virtual router is the software entity that provides packet routing and forwarding data plane functionality on the compute node. The compute node may be hosting VMs or containers centrally orchestrated and provisioned. The virtual router may work with an SDN controller to create the overlay network by exchanging routes, configurations, and other data. A virtual router can run as either a Linux kernel module or a DPDK-based process. DPDK allows a virtual router to process more packets per second than is possible when running as a kernel module. This virtual router data plane may be containerized. In combination, the containerized cRPD and containerized DPDK-based virtual router may thus be a fully functional containerized router.

The compute node may be used to implement parts of a ($5^{th}$ generation) cellular network using cloud-native, Open Radio Access Network ("O-RAN" or "Open RAN") architecture. The cloud may be built with containers and Kubernetes. The cell-site router functionality may be realized on compute nodes that host Distributed Unit (DU) 5G functionality as containerized applications. That is, DU functionality may be realized as Kubernetes Pods on these compute nodes. At a very high level, the DU functionality will consume RAN traffic, process it, and send it over tunnels to the Control Unit functionality (CU) hosted in a data center.

To meet the routing functionality and forwarding performance requirements that may be involved in 5G network use cases, the compute nodes may be configured to use a Cloud Native Router with a hybrid data plane in which a cRPD running on the compute node operates as the control plane and configures the Cloud Native Router to include both kernel-based routing and a DPDK-based virtual router. The kernel-based routing can process routings and encapsulations that the DPDK-based virtual router is not capable of handling, and the DPDK virtual router provides a fast path data plane for pods that do not require more complex encapsulations.

In an example, a system is described that includes processing circuitry; a containerized application; a physical network interface; a data plane development kit (DPDK)-based virtual router configured to execute on the processing circuitry to send and receive packets via the physical network interface; and a kernel network stack configured to execute on the processing circuitry to perform tunneling processing for packets destined to the containerized application and received by the DPDK-based virtual router via the physical interface.

In another example, a method is described that includes receiving, from a physical interface by a data plane development kit (DPDK)-based virtual router executed by processing circuitry, a first packet destined for a containerized application; determining, by the DPDK-based virtual router whether a kernel network stack executed by the processing circuitry is to perform tunneling processing for the first packet; and in response to determining that the kernel network stack is to perform tunneling processing for the first packet, forwarding, by the DPDK-based virtual router, the first packet to the kernel network stack.

In a further example, a computer-readable storage medium is described that includes computer-executable instructions, that when executed, cause one or more processors that execute a DPDK-based virtual router to perform operations comprising: receive a first packet destined for a containerized application; determine whether a kernel network stack executed by the one or more processors is to perform tunneling processing for the first packet; and in response to a determination that the kernel network stack is to perform tunneling processing for the first packet, forward the first packet to the kernel network stack.

The details of one or more examples of this disclosure are set forth in the accompanying drawings and the description below. Other features, objects, and advantages will be apparent from the description and drawings, and from the claims.

BRIEF DESCRIPTION OF DRAWINGS

FIG. 9 is an example deployment specification for a pod, in accordance with techniques of the disclosure.

Like reference characters denote like elements throughout the description and figures.

DETAILED DESCRIPTION

Figure 1A:
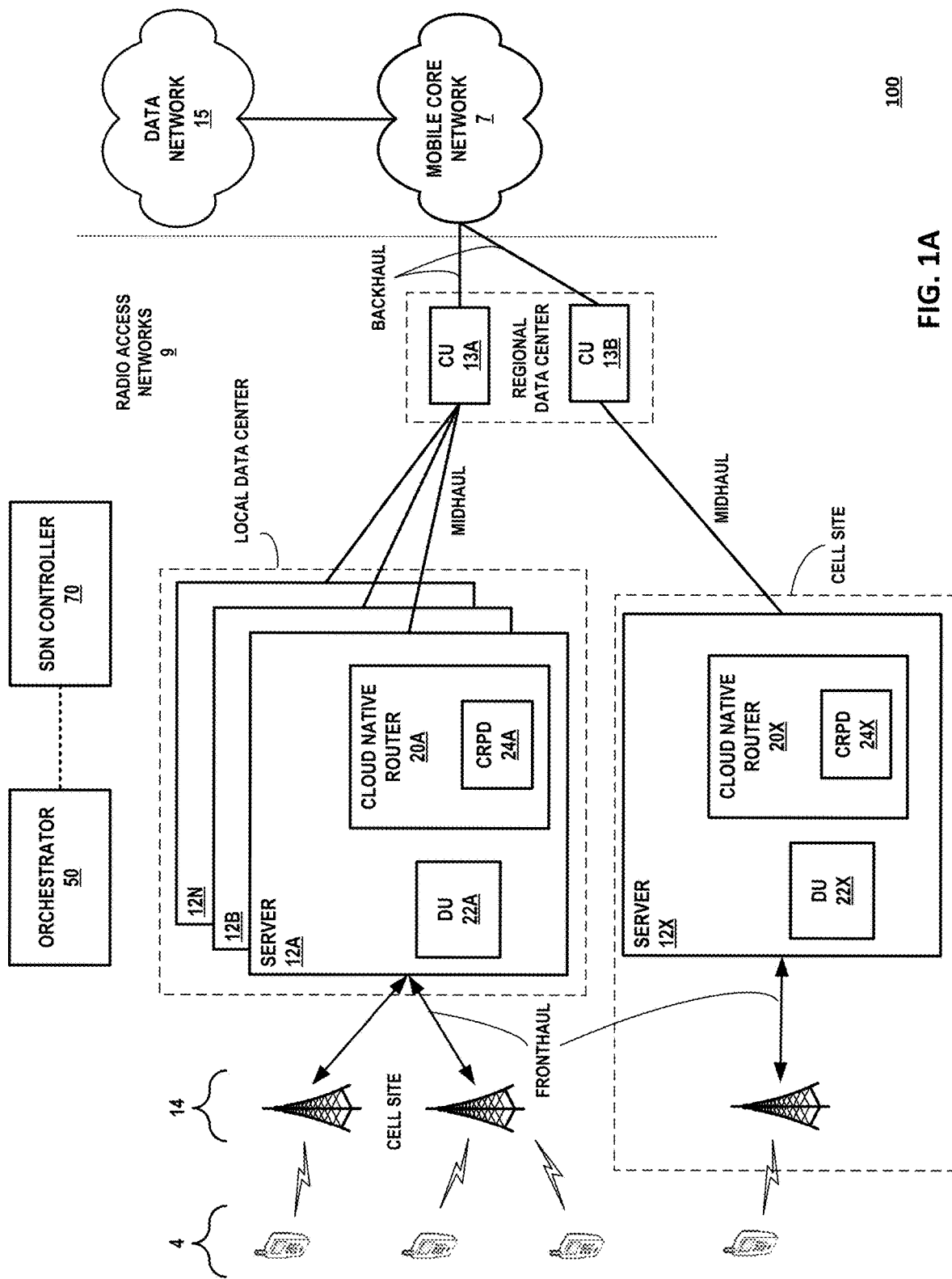
FIG. 1A is a block diagram illustrating an example mobile network system, in accordance with techniques described in this disclosure.

"Container-based" or "operating system" virtualization refers to the virtualization of an operating system to run multiple isolated systems on a single machine (virtual or physical). Such isolated systems represent containers, such as those provided by Kubernetes Container Runtime Interface-Open Container Initiative (CRI-O), containerd, the open-source Docker Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine (e.g., one of network devices 107) as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines. In some examples, containers may be deployed according to Linux Containers (LXC), an operating-system-level virtualization method for running multiple isolated Linux systems (containers) on a control host using a single Linux kernel.

5G uses a cloud-native approach in which functional blocks are decomposed into microservices. The microservices are deployed as containers on x86 platforms, orchestrated by Kubernetes (abbreviated as "K8s"). This includes 5G core control plane functions such Access and Mobility Management Function (AMF) and Session Management Function (SMF), RAN control plane functions such as CU-CP, service management and orchestration (SMO), Near-Real Time & Non-Real Time Radio Intelligent Controller (MC) and even some data-plane functions such as CU-DP and DU.

Kubernetes networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a telecommunications network. A Cloud Native Router (CNR), as described herein, provides a better fit for these situations. A Cloud Native Router is a containerized router that allows an x86 or ARM based host to be a first-class member of the network routing system, participating in protocols such as Intermediate System to Intermediate System (IS-IS) and Border Gateway Protocol (BGP) and providing Multiprotocol Label Switching/Segment Routing (MPLS/SR) based transport and multi-tenancy. In other words, rather than the platform being an appendage to the network (like a customer edge (CE) router), it may be operating as a provider edge (PE) router.

A Cloud Native Router may have one or more advantages over a conventional router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the Cloud Native Router is a virtualized router. However, the routing protocol software is functionally similar in both cases. This means the Cloud Native Router benefits from the same highly comprehensive and robust protocol implementation as the hardware-based routers that underpin some of the world's largest networks.

The Cloud Native Router uses a containerized routing protocol daemon (cRPD) Control Plane and a virtual router (virtual router) forwarding plane to deliver high performance networking in a small footprint, software package that is functionally similar to a non-virtual router, a physical network function (PNF). The forwarding plane may be implemented via a choice of DPDK, Linux Kernel or Smart-NIC. The complete integration delivers a K8s CNI-compliant package, deployable within a K8s environment (e.g., Multus-enabled).

A server may be a K8s worker/compute node (or "minion"). A pod can be plumbed into the Cloud Native Router. The pod may require multiple network interfaces, facilitated in some cases by the Multus meta-CNI. Each of these interfaces can be mapped into a different Layer 3 VPN on the Cloud Native Router to support multiple network slices. When triggered by K8s pod events, a CNI can dynamically add or delete interfaces between the pod and the virtual router. The CNI can also dynamically update the cRPD control plane container with host routes for each pod interface and corresponding Layer 3 VPN mappings, in the form of Route Distinguishers and Route Targets. The Layer 3 VPNs may be implemented using virtual routing and forwarding instances (VRFs). In turn, the cRPD control plane programs the virtual router forwarding plane accordingly via a gRPC interface. In this way, the Cloud Native Router is introduced into the data path, supporting the F1 interfaces to the CUs running in edge or regional DC sites. While described primarily with respect to O-RAN applications such as the Distributed Units, the Cloud Native Router techniques are applicable for configuring host-based virtual router for other containerized applications.

As the CNR is itself a cloud-native application, it supports installation using K8s manifests or Helm Charts. These include the initial configuration of the router, including routing protocols and Layer 3 VPNs to support slices. A CNR may be orchestrated and configured, in a matter of seconds, with all of the routing protocol adjacencies with the rest of the network up and running. Ongoing configuration changes during the lifetime of the CNR, for example to add or remove network slices, may be via a choice of CLI, K8s manifests, NetConf or Terraform.

By adopting a K8s CNI framework, the Cloud Native Router may mitigate the traditional operational overhead incurred when using a containerized appliance rather than its physical counterpart. By exposing the appropriate device interfaces, the Cloud Native Router may normalize the operational model of the virtual appliance to the physical appliance, eradicating the barrier to adoption within the operator's network operations environment. The Cloud Native Router may present a familiar routing appliance look-and-feel to any trained operations team. The Cloud Native Router has similar features and capabilities, and a similar operational model as a hardware-based platform. Likewise, a domain-controller can use the protocols that it is uses with any other Junos router to communicate with and control the Cloud Native Router, for example Netconf/ OpenConfig, gRPC, Path Computation Element Protocol (PCEP) and Programmable Routing Daemon (pRPD) application program interfaces (APIs).

FIG. 1A is a block diagram illustrating an example mobile network system, in accordance with techniques described in this disclosure. Mobile network system 100 may be a 5G network that implements 5G standards promulgated by, e.g., the 3$^{rd}$ Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment—different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively. Additional data plane elements known as user plane functions (UPFs) operate in mobile core network 7 to forward traffic between the CU and data network 15. Additional control plane elements operate in mobile core network 7. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 9 and mobile core network 7. Radio access networks 9 include RUs 14 located at various cellular network sites ("cell sites"). Each RU 14 consists of an LO PHY and a RF transmitter. The LO PHY component may be implemented using specialized hardware for high-performance packet processing.

RUs 14 connect to DUs 22A-22X (collectively, "DUs 22") via the fronthaul network. The fronthaul network connects LO PHY and HI PHY and is used by RUs 14 and DUs 22 to implement the F2 interface of 5G. DUs 22 manage the packet transmission of radio by the RUs 14. In some cases, such packet transmission conforms to the Common Packet Radio Interface (CPRI) and/or to the enhanced CPRI (eCPRI) standard, or to IEEE 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network, which may be used by DUs 22 and CUs 13 to implement the F1 interface of 5G. CUs 13 may implement the Radio Resource Control (RRC) and Packet Data Convergence Protocol (PDCP) layers. CUs 13 connect to mobile core network 7 via a backhaul network. The midhaul and backhaul networks may each be wide area networks (WANs).

In radio access networks 9 of mobile network system 100, the gNodeB includes one of CUs 13 and one of DUs 22. A CU may support multiple DUs to implement multiple gNodeBs. And one or more RUs may be supported by a single DU. Thus, for example with respect to FIG. 1A, CU 13A and DU 22A and one of RUs 14 may form one eNodeB, while CU 13A and DU 22B (of server 12B) and another one of RUs 14 may form another eNodeB.

As shown in FIG. 1A, any DU of DUs 22 may or may not be located at the cell site that includes the RU(s) 14 supported by the DU. DU 22X is located at the cell site, while DUs 22A-22N are located at a local data center and collectively support multiple RUs 14. Mobile network system 100 may have radio access networks 9 that include many thousands of cell sites, each having one or more RUs 14s and optionally one or more DUs 22. Whether located at a cell site or offsite, a DU is typically within 20 km of the supported RUs. CUs 13 are shown in FIG. 1A as located at a regional data center, typically within 40 km of the supported DUs 22.

Radio access networks 9 connect to mobile core network 7 to exchange packets with data network 15. Mobile core network 7 may be a 5G core network, and data network (DN) 15 may represent, for example, one or more service provider networks and services, the Internet, $3^{rd}$ party services, an IP-multimedia subsystem, or other network.

Mobile network system 100 includes multiple servers 12A-12X to execute DUs 22. Each of servers 12 may be a real or virtual server that hosts/executes software that implements DUs 22. Such software may include one or more applications deployed as, e.g., virtual machine or containers, to servers 12. While not shown in FIG. 1A, CUs 13 may also be executed by servers.

The combination of DUs 22, the midhaul network, CUs 13, and the backhaul network effectively implement an IP-based transport network between the radio units 14 and mobile core network 7.

Cloud Native Routers 20A-20X ("CNRs 20A-20X" and collectively, "CNRs 20") provide layer 3 routing functionality between DUs 22 and CUs 13. These CNRs 20 may be executed on the same server 12 as one or more DUs 22 to provide provider edge router functionality to such DUs 22. In some examples, any of CNRs 20 may be deployed to a local data center together with one or more DUs 22 for which the CNR provides IP services, as shown with respect to CNRs 20A-20N, i.e., where the local data center includes servers 12 that execute DUs 22 for one or more cell sites. In some examples, a CNR may be deployed at a cell site as shown in FIG. 1A. A CNR deployed at a cell site may be referred to as a "virtualized cell site router."

Each of CNRs 20 is implemented using one of containerized routing protocol daemons 24A-24X ("cRPDs 24A-24X" and collectively, "cRPDs 24"). More specifically, each of CNRs 20 uses a corresponding cRPD of cRPDs 24 as a control plane for implementing a layer 3 router. The cRPD provides control plane routing functions. For example, the cRPD can execute IP (IPv4/IPv6) underlay routing protocols such as Intermediate System-Intermediate System (IS-IS) and Border Gateway Protocol (BGP); advertise reachability of DUs 22 both inside and outside a cluster, e.g., to CUs 13; implement network namespaces (supported using L3VPN and EVPN Type-5 advertisements); implement Access Control Lists (ACLs) and network policies for security, network isolation, and quality of service (QoS); support tunnels and tunneling protocols (e.g., MPLS, SR-MPLS, SRv6, SR-MPLSoIPv6, SR-MPLSoIPv4, VxLAN, IP-in-IP, GRE); support dynamic tunnels signaled using BGP; support encryption for IPSec tunnels; and program a forwarding plane of the CNR of the server with learned and/or configured routing information to provide layer 3 packet forwarding, encapsulation, packet filtering, and/or QoS between one or more of DUs 22 and one of CUs 13.

For example, CNR 20A executed by server 12A includes cRPD 24A and a forwarding plane of server 12A (e.g., a SmartNIC, kernel-based forwarding plane, or Data Plane Development Kit (DPDK)-based forwarding plane). cRPD 24A provides one or more of the above routing functions to program a forwarding plane of CNR 20A in order to, among other tasks, advertise a layer 3 route for DU 22A outside of the cluster—including across the midhaul network to CU 13A—and forward layer 3 packets between DU 22A and CU 13A. In this way, the techniques realize cloud-native, containerized cell site routers 20 executing on the same servers 12 as containerized DUs 22, thus significantly reducing latency on the midhaul between DUs 22 and CUs 13.

CNRs 20 as containerized routers allow an x86-based or ARM-based host to be a first-class member of the network routing system, participating in protocols such as IS-IS and BGP and providing MPLS/SR-based transport and multi-tenancy. Thus, rather than being appendages to the network (similar to a customer edge (CE) router), CNRs 20 may operate as provider edge (PE) routers for networks transporting layer 3 packets among DUs 22, CUs 13, and mobile core network 7.

Moreover, in some examples, the integration of cRPDs 24 and host-based forwarding planes may also deliver a Kubernetes CNI-compliant package that is deployable within a Kubernetes environment. The execution by a single server of a DU 22 and a CNR 20 together can avoid a two-box solution with a separate DU and router, potentially reducing costs, power, and space requirements, which is particularly attractive for cell sites. Application workloads can be containerized network functions (CNFs), such as DUs.

Orchestrator 50 represents a container orchestration platform. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS. Orchestrator 50 orchestrates DUs 22 and at least containerized RPDs 24 of CNRs 20. In some examples, the data plane of CNRs 20 is also containerized and orchestrated by orchestrator 50. The data plane may be DPDK-based data plane, a kernel-based data plane, or a hybrid data plane as described further below.

Containers, including those implementing containerized routing protocol daemons 24, may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master node" and "minion nodes," while the Docker Swarm platform refers to cluster managers and cluster nodes. Servers 12 or virtual machines thereon may represent cluster nodes.

Orchestrator 50 and software defined network (SDN) controller 70 may execute on separate computing devices or execute on the same computing device. Each of orchestrator 50 and SDN controller 70 may each be a distributed application that executes on one or more computing devices. Orchestrator 50 and SDN controller 70 may implement respective master nodes for one or more clusters each having one or more minion nodes implemented by respective servers 12. In general, SDN controller 70 controls the network configuration of radio access network 9 to facilitate packetized communications among DUs 22, CUs 13, and mobile core network 7. SDN controller 70 may distribute routing and configuration information to the control plane elements of radio access networks 9, in particular, to cRPDs 24. SDN controller 70 may, for instance, program segment routing headers, configure L3VPNs, configure VRFs in routers of radio access network 9 (including Cloud Native Routers 20). SDN controller 70 may implement one or more southbound protocols for configuring router, switches, and other networks devices of the midhaul and backhaul networks, as well as for configuring CNRs 20. Example southbound protocols may include Path Computation Element Protocol (PCEP), BGP, Netconf, OpenConfig, another protocol for configuring cRPDs 24, and so forth. Additional information regarding L3VPNs is found in "BGP/MPLS IP Virtual Private Networks (VPNs)," Request for Comments 4364, Network Working Group of Internet Engineering Task Force, February 2006, which is incorporated by reference in its entirety.

SDN controller 70 may provide a logically and in some cases physically centralized controller. In some examples, SDN controller 70 may operate in response to configuration input received from orchestrator 50 and/or an administrator/operator. SDN controller 70 may program NFV infrastructure (NFVI) such as servers 12, network switches/routers, and/or other network infrastructure. In the case of NFVI programming, SDN controller 70 may configure aspects of the operating system kernel to configure L3 IP routing, Linux bridges, iptables, network namespaces, and/or virtual switches.

Additional information of an example SDN controller 70, virtual router, and virtual router agent is found in International Application Number PCT/US2013/044378, filed Jun. 5, 2013, and entitled "PHYSICAL PATH DETERMINATION FOR VIRTUAL NETWORK PACKET FLOWS;" U.S. patent application Ser. No. 14/226,509, filed Mar. 26, 2014, and entitled "Tunneled Packet Aggregation for Virtual Networks;" and in U.S. patent application Ser. No. 17/305,110, filed Jun. 30, 2021, and entitled "Network Controller Horizontal Scaling for Network Device Configurations Session Management;" each of which is incorporated by reference as if fully set forth herein.

In general, orchestrator 50 controls the deployment, scaling, and operations of containers across clusters of servers 12 and the providing of computing infrastructure, which may include container-centric computing infrastructure. Orchestrator 50 and, in some cases, network controller 70 may implement respective cluster masters for one or more Kubernetes clusters. As an example, Kubernetes is a container management platform that provides portability across public and private clouds, each of which may provide virtualization infrastructure to the container management platform.

Figure 1B:
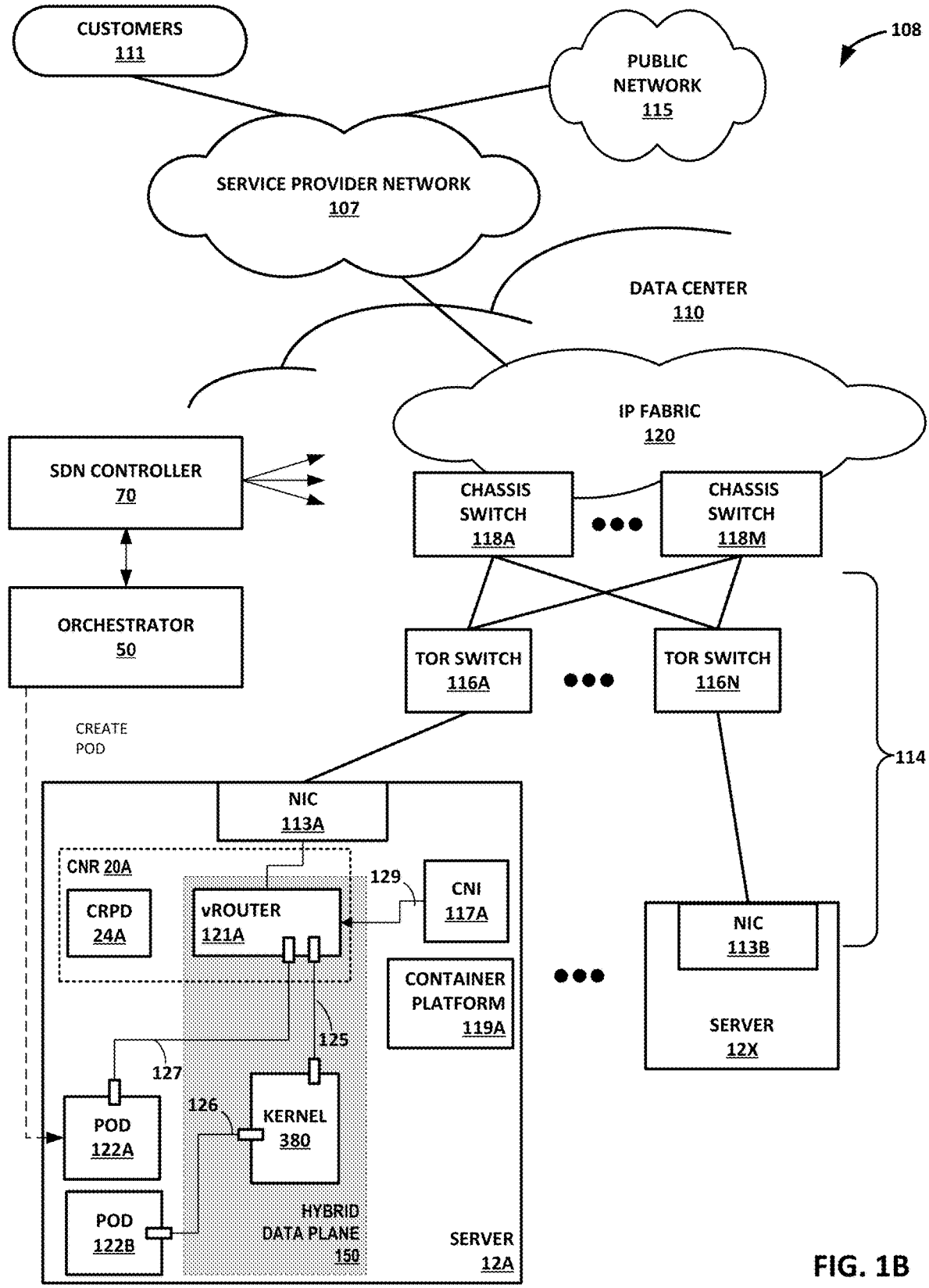
FIG. 1B is a block diagram illustrating an example computing infrastructure in which examples of the techniques described herein may be implemented.

FIG. 1B is a block diagram illustrating an example computing infrastructure 108 in which examples of the techniques described herein may be implemented. In general, data center 110 provides an operating environment for applications and services for customer sites 111 (illustrated as "customers 111") having one or more customer networks coupled to the data center by service provider network 107. Data center 110 may be an implementation of the local data center and/or regional data center shown in FIG. 1A. Data center 110 may, for example, host infrastructure equipment, such as networking and storage systems, redundant power supplies, and environmental controls. Service provider network 107 is coupled to public network 115, which may represent one or more networks administered by other providers, and may thus form part of a large-scale public network infrastructure, e.g., the Internet. Public network 115 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 107, an enterprise IP network, or some combination thereof. Public network 115 may be data network 15 of FIG. 1A or a network accessible via data network 15.

Although customer sites 111 and public network 115 are illustrated and described primarily as edge networks of service provider network 107, in some examples, one or more of customer sites 111 and public network 115 may be tenant networks within data center 110 or another data center. For example, data center 110 may host multiple tenants (customers) each associated with one or more virtual private networks (VPNs), each of which may implement one of customer sites 111.

Service provider network 107 offers packet-based connectivity to attached customer sites 111, data center 110, and public network 115. Service provider network 107 may represent a network that is owned and operated by a service provider to interconnect a plurality of networks. Service provider network 107 may implement Multi-Protocol Label Switching (MPLS) forwarding and in such instances may be referred to as an MPLS network or MPLS backbone. In some instances, service provider network 107 represents a plurality of interconnected autonomous systems, such as the Internet, that offers services from one or more service providers. In some aspects, service provider network 107 may be an implementation of mobile core network 7 of FIG. 1A.

In some examples, data center 110 may represent one of many geographically distributed network data centers. As illustrated in the example of FIG. 1B, data center 110 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 107, elements of data center 110 such as one or more physical network functions (PNFs) or virtualized network functions (VNFs) may be included within the service provider network 107 core.

In this example, data center 110 includes storage and/or compute servers (or "nodes") interconnected via switch fabric 114 provided by one or more tiers of physical network switches and routers, with servers 12 depicted as coupled to top-of-rack switches 116A-116N. Although only server 12A coupled to TOR switch 116A is shown in detail in FIG. 1B, other servers 12 may be coupled to other TOR switches 116 of the data center 110.

Switch fabric 114 in the illustrated example includes interconnected top-of-rack (TOR) (or other "leaf") switches 116A-116N (collectively, "TOR switches 116") coupled to a distribution layer of chassis (or "spine" or "core") switches 118A-118M (collectively, "chassis switches 118"). Although not shown, data center 110 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 110 may also include one or more physical network functions (PNFs) such as physical firewalls, load balancers, routers, route reflectors, broadband network gateways (BNGs), mobile core network elements, and other PNFs.

In this example, TOR switches 116 and chassis switches 118 provide servers 12 with redundant (multi-homed) connectivity to IP fabric 120 and service provider network 107. Chassis switches 118 aggregate traffic flows and provides connectivity between TOR switches 116. TOR switches 116 may be network devices that provide layer 2 (MAC) and/or layer 3 (e.g., IP) routing and/or switching functionality. TOR switches 116 and chassis switches 118 may each include one or more processors and a memory and can execute one or more software processes. Chassis switches 118 are coupled to IP fabric 120, which may perform layer 3 routing to route network traffic between data center 110 and customer sites 111 by service provider network 107. The switching architecture of data center 110 is merely an example. Other switching architectures may have more or fewer switching layers, for instance. IP fabric 120 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Server 12 may be configured with kernel 380. Kernel 380 may manage operations of server 12, including scheduling processes, threads or other executable units and managing devices, file systems, and memory of server 12. Kernel 380 may represent a Linux kernel, other Unix-variant kernel, or other operating system kernel that includes a network stack and is capable of packet forwarding.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 110. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 110 gateway router (not shown in FIG. 1B). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 120 and switching fabric 114 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 121A, virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 121 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 121 needs to contain all IP prefixes or all MAC addresses for all virtual machines in the entire data center. A given virtual router 121 only needs to contain those routing instances that are locally present on the server 12 (i.e., which have at least one virtual execution element present on the server 12.)

The control plane protocol between the control plane nodes of the SDN controller 70 or a physical gateway router (or switch) may be BGP (and may be Netconf for management). This is the same control plane protocol may also be used for MPLS L3VPNs and MPLS EVPNs. The protocol between the SDN controller 70 and the virtual routers 121 may be based on XMPP, for instance.

Servers 12 host virtual network endpoints for one or more virtual networks that operate over the physical network represented here by IP fabric 120 and switch fabric 114. Although described primarily with respect to a data center-based switching network, other physical networks, such as service provider network 107, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1B, server 12A hosts virtual network endpoints in the form of pods 122A and 122B, each having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 113A to perform packet I/O and receive/send packets on one or more communication links with TOR switch 116A. Other examples of virtual network interfaces are described below.

Servers 12 each includes at least one network interface card (NIC) 113, which each includes at least one interface to exchange packets with TOR switches 116 over a communication link. For example, server 12A includes NIC 113A. Any of NICs 113 may provide one or more virtual hardware components 121 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-My specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 121. As another example, one or more servers 12 may implement virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 113 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 113A may be associated with a layer 2 destination address, which may be assigned by the NIC 113A or a software process responsible for configuring NIC 113A. The physical hardware component (or "physical function" for SR-IOV implementations) is also associated with a layer 2 destination address.

One or more of servers 12 may each include a virtual router 121 that executes one or more routing instances for corresponding virtual networks within data center 110 to provide virtual network interfaces and route packets among the virtual network endpoints. In some aspects, virtual router 121 may be incorporated as part of a CNR 20. In some aspects, virtual router may be a virtual router that is implemented in kernel space memory of a server 12, and may be referred to as a "kernel-based" virtual router. In some aspects, virtual router 121 may be implemented in user memory space of server 12 and support DPDK interfaces. Such virtual routers may be referred to as "DPDK" virtual routers.

Each of the routing instances of virtual router 121 may be associated with a network forwarding table. Each of the routing instances may represent a virtual routing and forwarding instance (VRF) for an Internet Protocol-Virtual Private Network (IP-VPN). Packets received by the virtual router 121A of server 12A, for instance, from the underlying physical network fabric of data center 110 (i.e., IP fabric 120 and switch fabric 114) may include an outer header to allow the physical network fabric to tunnel the payload or "inner packet" to a physical network address for a network interface card 113A of server 12A that executes the virtual router. The outer header may include not only the physical network address of the network interface card 113A of the server but also a virtual network identifier such as a VxLAN tag or Multiprotocol Label Switching (MPLS) label that identifies one of the virtual networks as well as the corresponding routing instance executed by the virtual router 121A. An inner packet includes an inner header having a destination network address that conforms to the virtual network addressing space for the virtual network identified by the virtual network identifier.

Virtual routers 121 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A and coupled to virtual router 121A (e.g., pod 122A), the virtual router 121A attaches a tunnel encapsulation header indicating the virtual network for the packet to generate an encapsulated or "tunnel" packet, and virtual router 121A outputs the encapsulated packet via overlay tunnels for the virtual networks to a physical destination computing device, such as another one of servers 12. As used herein, a virtual router 121 may execute the operations of a tunnel endpoint to encapsulate inner packets sourced by virtual network endpoints to generate tunnel packets and decapsulate tunnel packets to obtain inner packets for routing to other virtual network endpoints.

In the example of FIG. 1B, virtual router 121A is a Data Plane Development Kit (DPDK)-enabled virtual router. That is, virtual router 121A uses DPDK as a data plane. In this mode, virtual router 121A runs as a user space application that is linked to the DPDK library (not shown). This is a performance version of a virtual router and is commonly used by telecommunications companies, where the VNFs are often DPDK-based applications. The performance of virtual router 121A as a DPDK virtual router can achieve much higher throughput than a virtual router operating as a kernel-based virtual router. The physical interface is used by DPDK's poll mode drivers (PMDs) instead of Linux kernel's interrupt-based drivers, thereby eliminating much of the context switching overhead associated with interrupt-based drivers.

A user-I/O (UIO) kernel module, such as vfio or uio_pci_generic, may be used to expose a physical network interface's registers into user space so that they are accessible by the DPDK PMD. When NIC 113A is bound to a UIO driver, it is moved from Linux kernel space to user space and therefore no longer managed nor visible by the Linux OS. Consequently, it is the DPDK application (i.e., virtual router 121A in this example) that fully manages the NIC 113. This includes packets polling, packets processing, and packets forwarding. User packet processing steps may be performed by the virtual router 121A DPDK data plane with limited or no participation by the kernel (kernel not shown in FIG. 1B). The nature of this "polling mode" makes the virtual router 121A DPDK data plane packet processing/forwarding much more efficient as compared to the interrupt mode, particularly when the packet rate is high. There are limited or no interrupts and context switching during packet I/O.

Additional details of an example of a DPDK virtual router are found in "DAY ONE: CONTRAIL DPDK VROUTER," 2021, Kiran K N et al., Juniper Networks, Inc., which is incorporated by reference herein in its entirety.

Computing infrastructure 108 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 108 include at least servers 12, orchestrator 50, and SDN controller 70. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 50 and SDN controller 70 may execute on separate computing devices, execute on the same computing device. Each of orchestrator 50 and SDN controller 70 may be a distributed application that executes on one or more computing devices. Orchestrator 50 and SDN controller 70 may implement respective master nodes for one or more clusters each having one or more minion nodes implemented by respective servers 12 (also referred to as "compute nodes").

In general, SDN controller 70 controls the network configuration of the data center 110 fabric to, e.g., establish one or more virtual networks for packetized communications among virtual network endpoints. SDN controller 70 provides a logically and in some cases physically centralized controller for facilitating operation of one or more virtual networks within data center 110. In some examples, SDN controller 70 may operate in response to configuration input received from orchestrator 50 and/or an administrator/operator. Additional information regarding SDN controller 70 operating in conjunction with other devices of data center 110 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein.

In general, orchestrator 50 controls the deployment, scaling, and operations of containers across clusters of servers 12 and providing computing infrastructure, which may include container-centric computing infrastructure. Orchestrator 50 and, in some cases, SDN controller 70 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 6B.

In one example, pods 122A and 122B are Kubernetes pods, and are examples of a virtual network endpoint. A pod is a group of one or more logically related containers (not shown in FIG. 1B), the shared storage for the containers, and options on how to run the containers. Where instantiated for execution, a pod may alternatively be referred to as a "pod replica." Each container of pods 122A and 122B is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 119A for running containerized applications, such as those of pods 122A and 122B. Container platform 119A receives requests from orchestrator 50 to obtain and host, in server 12A, containers. Container platform 119A obtains and executes the containers.

Container platform 119A includes a container network interface (CNI) 117A that configures virtual network interfaces for virtual network endpoints. The orchestrator 50 and container platform 119A uses CNI 117A to manage networking for pods, including pods 122A and 122B. For example, the CNI 117A creates virtual network interfaces to connect pod 122A to virtual router 121A and creates virtual network interfaces to connect pod 122B to kernel 380. CNI 117A thereby enables containers of such pods to communicate, via their respective virtual network interfaces, to other virtual network endpoints over the virtual networks. CNI 117A may, for example, insert a virtual network interface for a virtual network into the network namespace for containers in pod 122A and configure (or request to configure) the virtual network interface for the virtual network in virtual router 121A such that the virtual router 121A is configured to send packets received from the virtual network via the virtual network interface to containers of pod 122A and to send packets received via the virtual network interface from containers of pod 122A on the virtual network. CNI 117A may assign a network address (e.g., a virtual IP address for the virtual network) and may set up routes for the virtual network interface. In Kubernetes, by default all pods can communicate with all other pods without using network address translation (NAT). In some cases, the orchestrator 50 and SDN controller 70 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 50. When a user creates an isolated namespace for a pod, orchestrator 50 and SDN controller 70 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 117A may represent a library, a plugin, a module, a runtime, or other executable code for server 12A. CNI 117A may conform, at least in part, to the Container Network Interface (CNI) specification or the rkt Networking Proposal. CNI 117A may represent a Contrail, OpenContrail, Multus, Calico, cRPD, or other CNI. CNI 117A may alternatively be referred to as a network plugin or CNI plugin or CNI instance. Separate CNIs may be invoked by, e.g., a Multus CNI to establish different virtual network interfaces for pod 122A.

CNI 117A is invoked by orchestrator 50. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

In the example of FIG. 1B, pod 122A includes a containerized DPDK workload that is designed to use DPDK to accelerate packet processing, e.g., by exchanging data with other components using DPDK libraries. Pod 122B is configured to utilize network services and stacks provided by kernel 380.

CNI 117A may configure, for pods 122A and 122B, in conjunction with one or more other components shown in FIG. 1B, data interfaces 126 and 127. These may be different types of interfaces. Data interface 126 and data interface 127 may be referred to herein as virtual network interfaces. Other example types of virtual network interfaces are described below. Any of the containers of the pods 122A and 122B may utilize, i.e., share, any virtual network interface of their respective pod.

Pod 122A is configured with data interface 127 that is used for high-throughput packet processing, more specifically, for sending and receiving packets with virtual router 121A for high-throughput applications. Pod 122A and virtual router 121A exchange data packets using data interface 127. Data interface 127 may be a DPDK interface. Pod 122A and virtual router 121A may set up data interface 127 using vhost. Pod 122A may operate according to an aggregation model. Pod 122A may use a virtual device, such as a virtio device with a vhost-user adapter, for user space container inter-process communication for data interface 127. The workload of pod 122A is thus built on DPDK and operates data interface 127 using DPDK. Pod 122A and virtual router 121A may bring up DPDK interfaces using vhost. Pod 122A may operate as a vhost server in some examples, with virtual router 121A as the vhost client, for setting up a DPDK interface. Virtual router 121A may operate as a vhost server in some examples, with pod 122 as the vhost client, for setting up a DPDK interface.

Pod 122B is configured with data interface 126 that is used sending and receiving packets with kernel 380. A workload of pod 122B may not be configured for high throughput data communication, and may require encapsulations or other network services that vrouter 121A is unable to provide.

Network packets sent and received by pods 122A and 122B may take different paths to and from NIC 113A. For example, pod 122A exchanges network packets with virtual router 121A via data interface 127. Virtual router 121A sends or receives network packets from NIC 113A. Virtual router 121A and NIC 113A form a DPDK data plane for pod 122A.

Pod 122B exchanges network packets with kernel 380. Kernel 380 processes network packets sent and received by pod 122B, including encapsulating or decapsulating the packets as necessary. In some aspects, kernel 380 sends and receives packets via virtual router 121A using data interface 125. In this case, virtual router 121A acts as a "pass-through" with respect to kernel 380, and does not perform any network processing of packets received from kernel 380 for transmission via NIC 113, or for packets received from NIC 113A that have pod 122B as a destination. Kernel 380, virtual router 121A and NIC 113A from a kernel data plane.

Virtual router 121A and kernel 380 are configured to interoperate as will be further described below to provide hybrid data plane 150. Hybrid data plane 150 allows pods such as pods 122A and 122B to be configured to use a DPDK data plane of hybrid data plane 150 or a kernel data plane of hybrid data plane 150.

With respect to pod 122B, a virtual network interface may represent a virtual ethernet ("veth") pair, where each end of the pair is a separate device (e.g., a Linux/Unix device), with one end of the pair assigned to pod 122B and one end of the pair assigned to kernel 380. The veth pair or an end of a veth pair are sometimes referred to as "ports". A virtual network interface may represent a macvlan network with media access control (MAC) addresses assigned to the pod 122B and to kernel 380 for communications between containers of pod 122B and network stacks of kernel 380. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1B, pods 122A and 122B are virtual network endpoints in one or more virtual networks. Orchestrator 50 may store or otherwise manage configuration data for application deployments that specifies a virtual network and specifies that a pod (or the one or more containers therein) is a virtual network endpoint of the virtual network. Orchestrator 50 may receive the configuration data from a user, operator/administrator, or other machine system, for instance.

As part of the process of creating pod 122A or 122B, orchestrator 50 requests that SDN controller 70 create respective virtual network interfaces for the virtual networks (indicated in the configuration data). A pod may have a different virtual network interface for each virtual network to which it belongs. For example, each of data interface 126 and data interface 127 may be a virtual network interface for a particular virtual network. Additional data interfaces may be configured for other virtual networks. SDN controller 70 processes the request to generate interface configuration data for the virtual network interfaces for the pods 122A and 122B. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

SDN controller 70 sends interface configuration data to server 12A and, more specifically in some cases, to virtual router 121A. To configure a virtual network interface for a pod (e.g., pod 122A or pod 122B), orchestrator 50 may invoke CNI 117A. CNI 117A obtains the interface configuration data from virtual router 121A and processes it. CNI 117A creates each virtual network interface specified in the interface configuration data.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Figure 2:
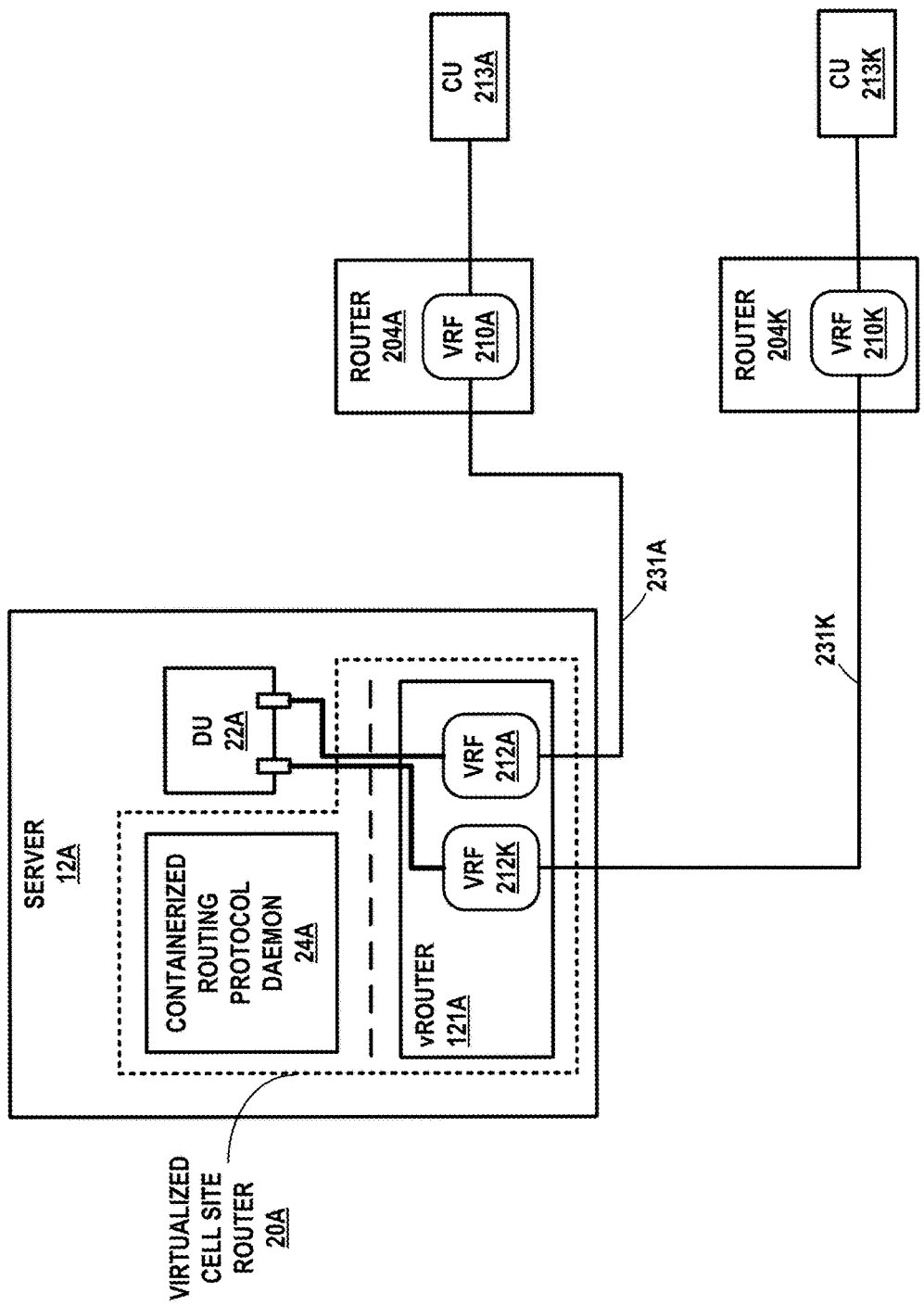
FIG. 2 is a block diagram illustrating an example implementation of a part of the network systems of FIGS. 1A and 1B in further detail, in accordance with techniques of this disclosure.

FIG. 2 is a block diagram illustrating an example implementation of a part of the network systems of FIGS. 1A and 1B in further detail, in accordance with techniques of this disclosure. System 200 includes CUs 213A-213K, each of which may represent any of CUs 13 of FIG. 1A. In this example, multiple network slices (e.g., 5G network slices)

are implemented using L3VPNs and tunnels 231A-231K to connect DU 22A to different CUs 213A-213K for respective network slices.

A network slice provides a way to segment a mobile network to support a particular type of service or business or even to host service providers (multi-tenancy) who do not own a physical network. Furthermore, each slice can be optimized according to capacity, coverage, connectivity, security and performance characteristics. Since the slices can be isolated from each other, as if they are physically separated both in the control and user planes, the user experience of the network slice will be the same as if it was a separate network. A network slice can span all domains of the network including software applications (both memory and processing) running on network nodes, specific configurations of the core transport network, access network configurations as well as the end devices. The network slicing enables multiple operators to share a mobile network securely but by separating their own users from others, and different applications of a user to use different network slices that provide widely different performance characteristics.

Cloud native router 20A includes a virtual router forwarding plane (virtual router) 121A configured with VRFs 212A-212K (collectively, "VRFs 212") for respective network slices implemented with respective L3VPNs, which CNR 20A and routers 204A-204B implement using tunnels 231A-231K connecting VRFs 212 to VRFs 210A-210K on routers 204A-204B. Each of tunnels 231A-231K may represent a SR-MPLSoIPv6 or other type of tunnel mentioned above. Each of routers 204A-204K may be a gateway router for a data center (e.g., data center 100 of FIG. 1A) having one or more servers to execute any one or more of CUs 213A-213K. The data center may include a data center fabric to switch mobile data traffic between the router and the CU. In some cases, the one or more servers of the data center may also execute a UPF for the mobile network, in which case the data center fabric may also switch mobile data traffic between the CU and the UPF.

Each of the VRFs 212A-212K has a corresponding virtual network interface to DU 22A. Each of the virtual network interfaces of DU 22A may thus be mapped into a different L3VPN in CNR 20A in order to, e.g., support a different one of multiple network slices. As described in further detail below, CNI 117A of server 12A (FIG. 1B) when triggered by pod events from orchestrator 50, dynamically adds or deletes virtual network interfaces between the pod (here deployed with DU 22A) and the virtual router 121A, which may also be deployed as container in some examples. CNI 117A also dynamically updates cRPD 24A (the control plane of CNR 20A) with host routes for each DU 22A/pod virtual network interface and corresponding Layer 3 VPN mappings, in the form of Route Distinguishers and Route Targets. In turn, cRPD 24A programs virtual router 121A (the data plane of CNR accordingly, optionally using a gRPC interface. In this way, CNR 20A is introduced as a cloud-native router into the data path to, e.g., support the F1 interfaces to CUs 213A-213K that may be executing in edge or regional data center sites, for instance. Virtual router 121A may represent a SmartNIC-based virtual router, kernel-based virtual router, or DPDK-based virtual router in various examples.

Figure 3:
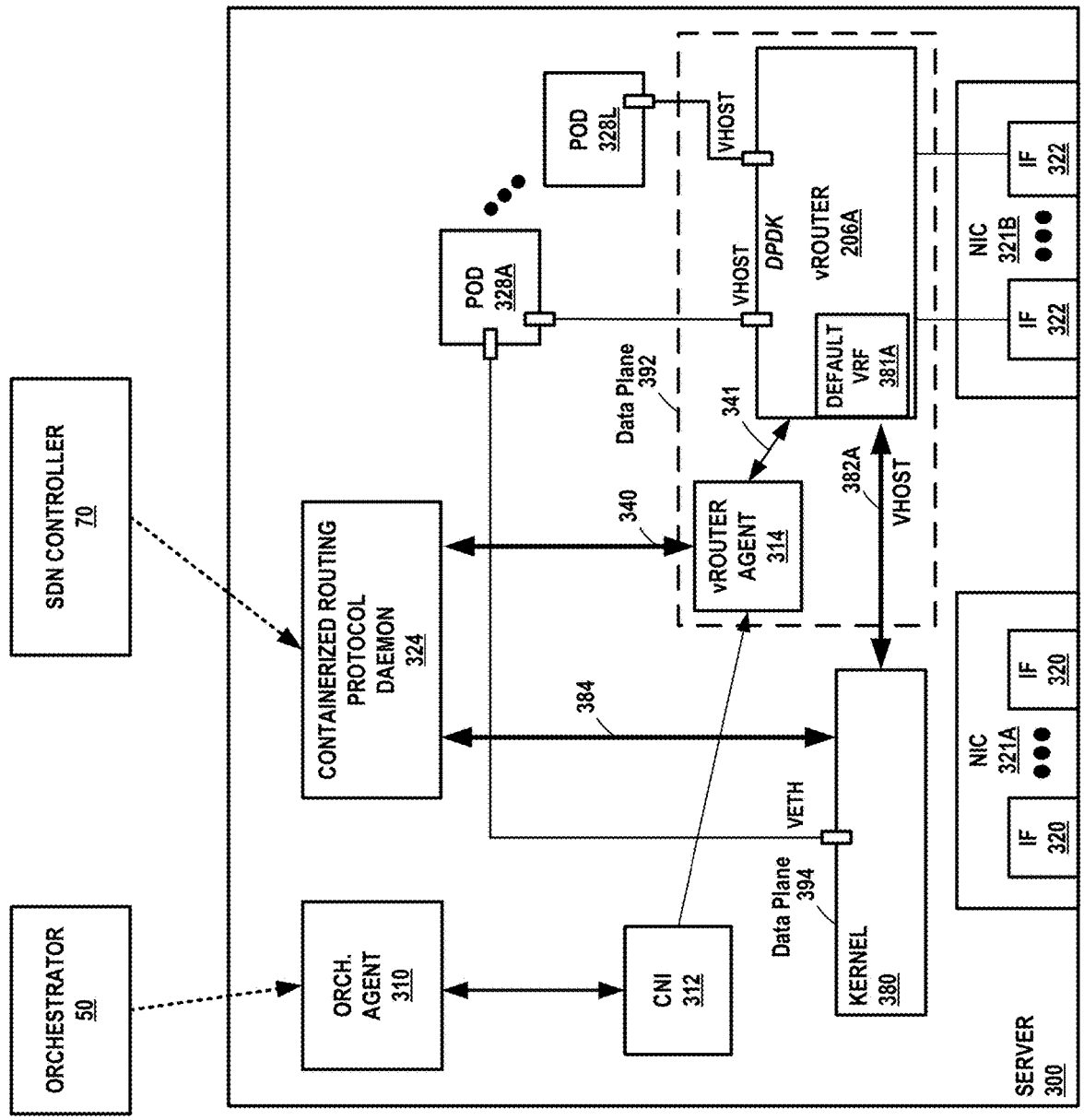
FIG. 3 is a block diagram illustrating an example server according to techniques of this disclosure.

FIG. 3 is a block diagram illustrating an example server according to techniques of this disclosure. Server 300 may represent any of servers 12 of FIGS. 1A and 1B. In some cases, servers 300 is configured to implement both a Cloud Native Router and distributed unit for same-box forwarding of mobile data traffic between DU 22A of FIG. 1A and the data plane of Cloud Native Router of 20A of FIG. 1A. Server 300 may be a bare-metal server or a virtual machine. An example hardware architecture for server 300 is described in FIGS. 6A and 6B.

Kernel 380 may manage operations of server 300, including scheduling processes, threads or other executable units and managing devices, file systems, and memory of server 300. Kernel 380 may represent a Linux kernel, other Unix-variant kernel, or other operating system kernel that includes a network stack and is capable of packet forwarding.

Server 300 includes one or more network interface cards (NICs) 321A-321B (collectively, "NICs 321") each having one or more hardware interfaces 320 and 322 respectively. In a 5G radio access network deployment, interfaces 320 of NIC 321A may be coupled via physical cabling to RUs. Interfaces 320 may implement the F2 interface. Interfaces 322 of NIC 321B may be coupled via physical cabling to the midhaul network, for sending/receiving mobile data traffic to/from CUs. Interfaces 322 may implement the F1 interface. In some examples, server 400 may have a single NIC with one or more interfaces 322.

Server 300 may host pods 328A-328L (collectively, "pods 328"). Pods 328 may be DUs in some cases. Pods 328 may be implementations of pods 122A and 122B of FIG. 1B. Pods 328A-328L are endpoints from the perspective of virtual router 206A, and in particular may represents overlay endpoints for one or more virtual networks that have been programmed into virtual router 206A.

At a high level, a DPDK-based virtual router data or forwarding plane ("virtual router") 206A is programmed by virtual router agent 314 with forwarding information for implementing a packet fast path. Virtual router agent 314 may be a user space process. Virtual router agent 314 may have a northbound interface 340 for receiving configuration and routing information from control plane processes, such as cRPD 324. cRPD 324 may be an example of cRPD 24A of FIGS. 1A and 1B. Virtual router agent 314 has a southbound interface 341 for programming virtual router 206A. Reference herein to a "virtual router" may refer to the virtual router forwarding plane specifically, or to a combination of the virtual router forwarding plane (e.g., virtual router 206A) and the corresponding virtual router agent (e.g., virtual router agent 314).

cRPD 324 may have a northbound interface for exchanging configuration and routing information with SDN controller 70. Containerized networking interface 312 may be a CNI plugin that configures the interfaces of the container workloads (pods 328A to 328L in this example) with the DPDK-based virtual router 206A. Orchestrator 50 may orchestrate DPDK-based virtual router 206A, cRPD 324, and/or pod 328 workloads on server 300 via requests sent to orchestration agent 310 of server 300. In some cases, workloads may have multiple interfaces and multiple types of interfaces (e.g., some with virtual router 206A and some with NIC 321A). Thus, CNI 312 may represent a combination of CNIs or unified CNI that is capable of configuring a workload with multiple types of interfaces. The multiple CNIs may be controlled by a master CNI such as Multus. Where orchestrator 50 is a Kubernetes master, CustomResourceDefinitions (CRDs) may be implemented for orchestrator 50 for supporting multi-tenancy and network isolation.

Orchestrator 50 orchestrates pods (e.g., pods 328A-328L) comprising container workloads via orchestration agent 310. CNI 312 configures virtual interfaces between pods and the data plane, which may be DPDK-based virtual router, a kernel-based virtual router, or a SmartNIC-based virtual router. In the example shown in FIG. 3, virtual router 206A is a DPDK-based virtual router. In some examples such as that shown in FIG. 3, CNI 312 configures a virtio interface for each pod as a vhost-user interface of the DPDK-based virtual router 206A. In some examples, CNI 312 configures veth pairs for each pod to virtual router 206A. In some examples, virtual router 206A has a bonded interface to NIC 321B, which may be an Intel-based NIC that supports DPDK. Bonded interfaces facilitate packet load balancing among fabric interfaces. Additional description of configuring virtual interfaces may be found in U.S. Pat. No. 10,728, 145, issued Jul. 28, 2020, which is incorporated by reference herein in its entirety.

In a Kubernetes deployment, CNI 312 provides networking for application workloads. This includes, for example, setting up interfaces, IP address management, and access control lists; advertising reachability of workloads within a Kubernetes cluster comprising any of servers 300 and servers 12 of FIGS. 1A and 1B (e.g., minion nodes); and setting up network namespaces.

cRPD 324 may incorporate elements of network service mesh architecture (NSM), service discovery, external endpoints, and tunneling. cRPD 324 may use exterior routing protocols such as Border Gateway Protocol (BGP) to advertise pod reachability both within and outside the Kubernetes cluster. cRPD 324 may use interior gateway and other routing protocols such as IS-IS, OSPF, Label Distribution Protocol (LDP), etc., to participate in underlay networking. cRPD 324 may also provide support for advanced L3VPN overlays using protocols/technologies such as MPLS, MPLSoUDP, or MPLSoGRE tunneling; VxLANs; SR-MPLS, SRv6, SRv4, and/or IPSec.

Virtual router 206A exposes respective interfaces 382A to kernel 380 for physical interfaces 322. That is, for each of physical interfaces, virtual router 206A exposes an interface to kernel 380. Each of interfaces 382A may be a vhost interface and may be terminated at a default VRF 381A. Kernel 380 may therefore send and receive network packets with virtual router 206A via interfaces 382.

In some examples, cRPD 324 runs routing protocols and can exchange routing protocol messages with routers external to server 300. Moreover, cRPD 324 can utilize kernel 380 network stack to obtain network topology information for the underlay network. cRPD 324 can use this topology information to establish routing protocol adjacencies with the external routers. Interfaces 382A provide access for cRPD 324, via kernel 380 and virtual router 206A, to physical interfaces 322 and thus to the underlay networks accessible via physical interfaces 322. As examples, such underlay networks may include the midhaul network, a switch fabric for a local data center in which server 300 is located, and so forth. Virtual router 206A can be configured with a route that causes virtual router 206A to forward network packets, received at one of physical interfaces 322 and destined for an IP address of the corresponding one of interfaces 382, via that corresponding one of interfaces 382A to kernel 380.

Kernel 380 outputs the network packets to cRPD 324 via interface 384. Interface 384 may represent system call interfaces/APIs exposed by kernel 380, a file system, pthread, socket, or other mechanism by which processes such as cRPD 324 can receive packets from and inject packets into kernel 380. cRPD 324 operates as the control plane for a router implemented by server 300 and DPDK-based virtual router 206A operates as the fast path forwarding plane for the router. In 5G environments such as that shown in FIG. 1A, cRPD 324 operates as the control plane for CNR 20A, while virtual router 206A and kernel 380 provide a data or forwarding plane for pods 328 and/or CNR 20A (FIG. 1B). CNI 312 leveraging cRPD 324 is thus able to facilitate multi-tenancy using L3VPNs, e.g., to implement network slices for different tenants; ACLs and network policies for applications; and IPSec for high security. DPDK-based virtual router 206A acts as the data plane or forwarding plane for forwarding data traffic between pods 328 and physical interfaces 322 in a way that may exclude the kernel 380.

Server 300 has two data planes for packet forwarding, a first data plane 394 implemented by kernel 380 and a second data plane 392 implemented by virtual router 206A. Second data plane 392 may be an implementation of hybrid data plane 150 of FIG. 1. DPDK-based virtual router 206A is configured with "ownership" of physical interfaces 322. In some aspects, DPDK-based virtual routers on server 300 such as virtual router 206A are configured with ownership of all of the physical interfaces of NICs 321 on server 300. Physical interfaces 322 may be VPN attachment circuits for VRFs 212. Physical interfaces 322 may be associated with respective interfaces of virtual router 206A by which virtual router 206A sends and receives traffic via physical interfaces 322.

First data plane 394 and second data plane 392 may store different routes for the underlay network and overlay network, respectively. First data plane 394 and second data plane 392 may independently perform forwarding lookups for and forward traffic using the respective, different stored routes. cRPD 324 is the routing protocol process for processing both underlay routes and overlay routes. Having learned the routes, whether by routing protocols or from SDN controller 70, cRPD 324 can selectively program underlay routes to kernel 380 and overlay routes to virtual router 206A (via virtual router agent 314). In some aspects, server 300 may be configured and operated as described below such that distinct data planes 394 and 392 are combined into a hybrid data plane.

Figure 4:
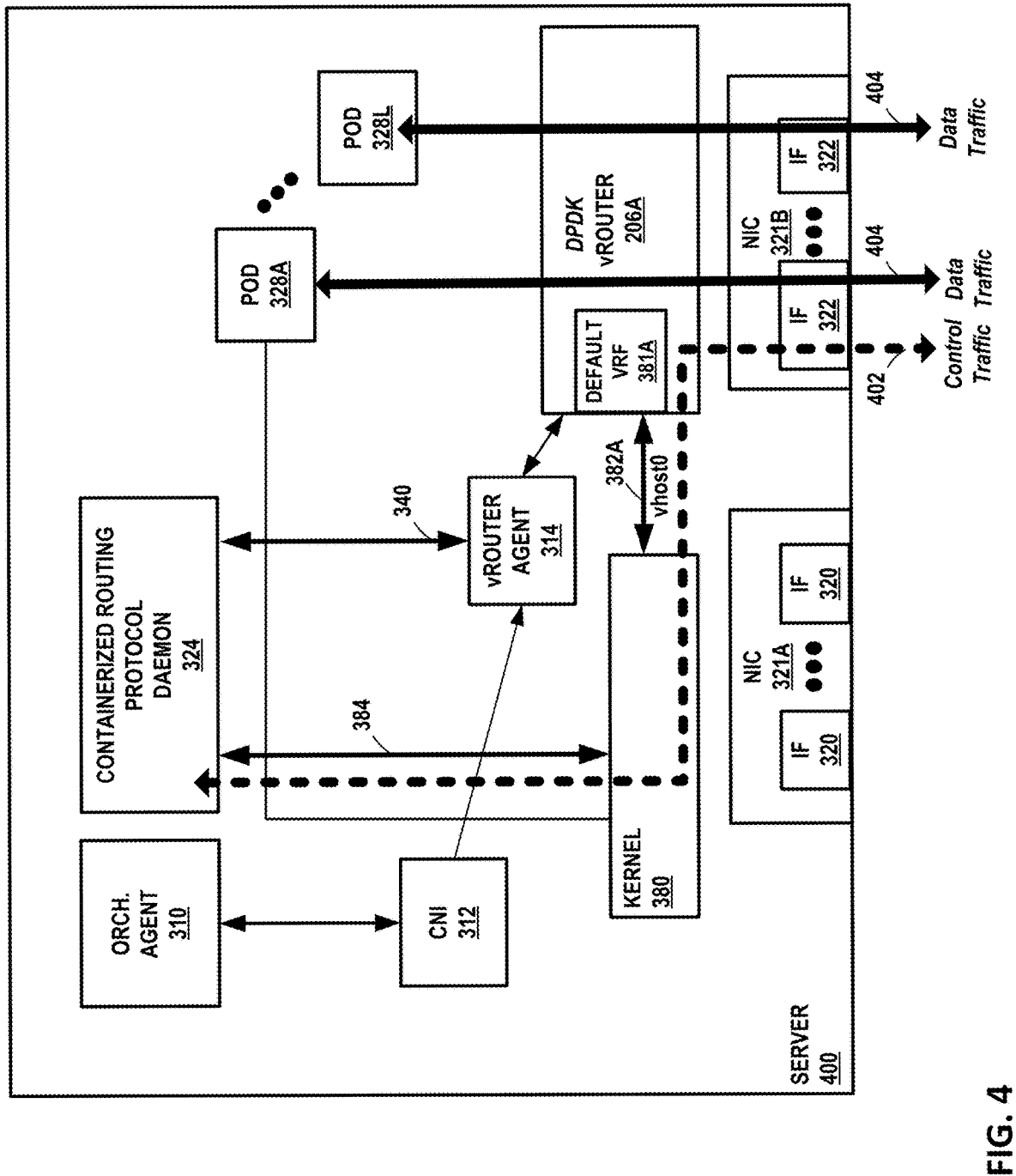
FIG. 4 is a block diagram illustrating an example server with example control and data traffic flows within the server, according to techniques of this disclosure.

FIG. 4 is a block diagram illustrating an example server with example control and data traffic flows within the server, according to techniques of this disclosure. Server 400 may be similar to servers described herein such as servers 12 of FIGS. 1A, 1B and 2, and server 300 of FIG. 3. PODs 328A-328L may be DUs in some cases. A vhost interface, vhost0 interface 382A, is exposed by virtual router 206A to kernel 380 and in some cases by kernel 380 to virtual router 206A. vhost interface 382A has an associated underlay host IP address for receiving traffic "at the host". Thus, kernel 380 may be a network endpoint of the underlay network that includes server 400 as a network device, the network endpoint having the IP address of vhost interface 382A. The application layer endpoint may be cRPD 324 or other process managed by kernel 380.

Underlay networking refers to the physical infrastructure that provides connectivity between nodes (typically servers) in the network. The underlay network is responsible for delivering packets across the infrastructure. Network devices of the underlay use routing protocols to determine IP connectivity. Typical routing protocols used on the underlay network devices for routing purposes are OSPF, IS-IS, and BGP. Overlay networking refers to the virtual infrastructure that provides connectivity between virtual workloads (typically VMs/pods). This connectivity is built on top of the underlay network and permits the construction of virtual networks. The overlay traffic (i.e., virtual networking) is usually encapsulated in IP/MPLS tunnels or other tunnels, which are routed by the underlay network. Overlay networks can run across all or a subset of the underlay network devices and achieve multi-tenancy via virtualization.

Control traffic 402 may represent routing protocol traffic for one or more routing protocols executed by cRPD 324. In server 400, control traffic 402 may be received over a physical interface 322 owned by virtual router 206A. Virtual router 206A is programmed with a route for the vhost0 interface 382A host IP address along with a receive next-hop, which causes virtual router 206A to send traffic, received at the physical interface 322 and destined to the vhost0 interface 382A host IP address, to kernel 380 via vhost0 interface 382A. From the perspective of cRPD 324 and kernel 380, all such control traffic 402 would appear to come from vhost0 interface 382A. Accordingly, cRPD 324 routes will specify vhost0 interface 382A as the forwarding next-hop for the routes. cRPD 324 selectively installs some routes to virtual router agent 314 and the same (or other) routes to kernel 380, as described in further detail below. Virtual router agent 314 will receive a forwarding information base (FIB) update corresponding to some routes received by cRPD 324. These routes will point to vHost0 interface 382A and virtual router 206A may automatically translate or map vHost0 interface 382A to a physical interface 322.

Routing information programmed by cRPD 324 can be classified into underlay and overlay. cRPD 324 will install the underlay routes to kernel 380, because cRPD 324 might need that reachability to establish additional protocols adjacencies/sessions with external routers, e.g., BGP multi-hop sessions over reachability provided by IGPs. cRPD 324 supports selective filtering of FIB updates to specific data planes, e.g., to kernel 380 or virtual router 206A using routing policy constructs that allow for matching against RIB, routings instance, prefix, or other property.

Control traffic 402 sent by cRPD 324 to virtual router 206A over vhost0 interface 382A may be sent by virtual router 206A out the corresponding physical interface 322 for vhost0 interface 382A.

As shown in FIG. 4, CNI 312 can create the virtual network (here, "pod") interfaces for each of the application pods 328A-328L on being notified by the orchestrator 50 via orchestration agent 310. One end of a pod interface terminates in a container included in the pod. CNI 312 may request virtual router 206A to start monitoring the other end of the pod interface, and cRPD 324 facilitates traffic from the physical interfaces 322 destined for application containers in DPDK-based pods 328A-322L to be forwarded using DPDK, exclusively, and without involving kernel 380. The reverse process applies for traffic sourced by pods 328A-328L.

However, because DPDK-based virtual router 206A manages these the virtual network interfaces for pods 328A-328L, the virtual network interfaces are not known to kernel 380. Server 400 may use tunnels exclusive to the DPDK forwarding path to send and receive overlay data traffic 404 internally among DPDK-based pods 328A-328L; virtual router 206A; and NIC 321B.

As such, in server 400, cRPD 324 interfaces with two data planes: kernel 380 and the DPDK-based virtual router 206A. cRPD 324 leverages the kernel 380 networking stack to setup routing exclusively for the DPDK fast path. The routing information cRPD 324 receives includes underlay routing information and overlay routing information. cRPD 324 runs routing protocols on vHost interface 382A that is visible in kernel 380, and cRPD 324 may install FIB updates corresponding to IGP-learnt routes (underlay routing information) in the kernel 380 FIB. This may enable establishment of multi-hop iBGP sessions to those destinations indicated in such IGP-learnt routes. Again, the cRPD 324 routing protocol adjacencies involve kernel 380 (and vHost interface 382A) because kernel 380 executes the networking stack.

Virtual router agent 314 for virtual router 206A notifies cRPD 324A about the application pod interfaces for pods 328A-328L. These pod interfaces are created by CNI 312 and managed exclusively (i.e., without involvement of kernel 380) by the virtual router agent 314. These pod interfaces are not known to the kernel 380. cRPD 324 may advertise reachability to these pod interfaces to the rest of the network as L3VPN routes including Network Layer Reachability Information (NLRI). In the 5G mobile network context, such L3VPN routes may be stored in VRFs of virtual router 206A for different network slices. The corresponding MPLS routes may be programmed by cRPD 324 only to virtual router 206A, via interface 340 with virtual router agent 314, and not to kernel 380. That is so because the next-hop of these MPLS labels is a pop-and-forward to a pod interface for one of pods 328A-328L; these interfaces are only visible in virtual router 206A and not kernel 380. Similarly, reachability information received over BGP L3VPN may be selectively programmed by cRPD 324 to virtual router 206A, for such routes are only needed for forwarding traffic generated by pods 328A-328L. The above routes programmed to virtual router 206A constitute overlay routes for the overlay network.

Figure 5:
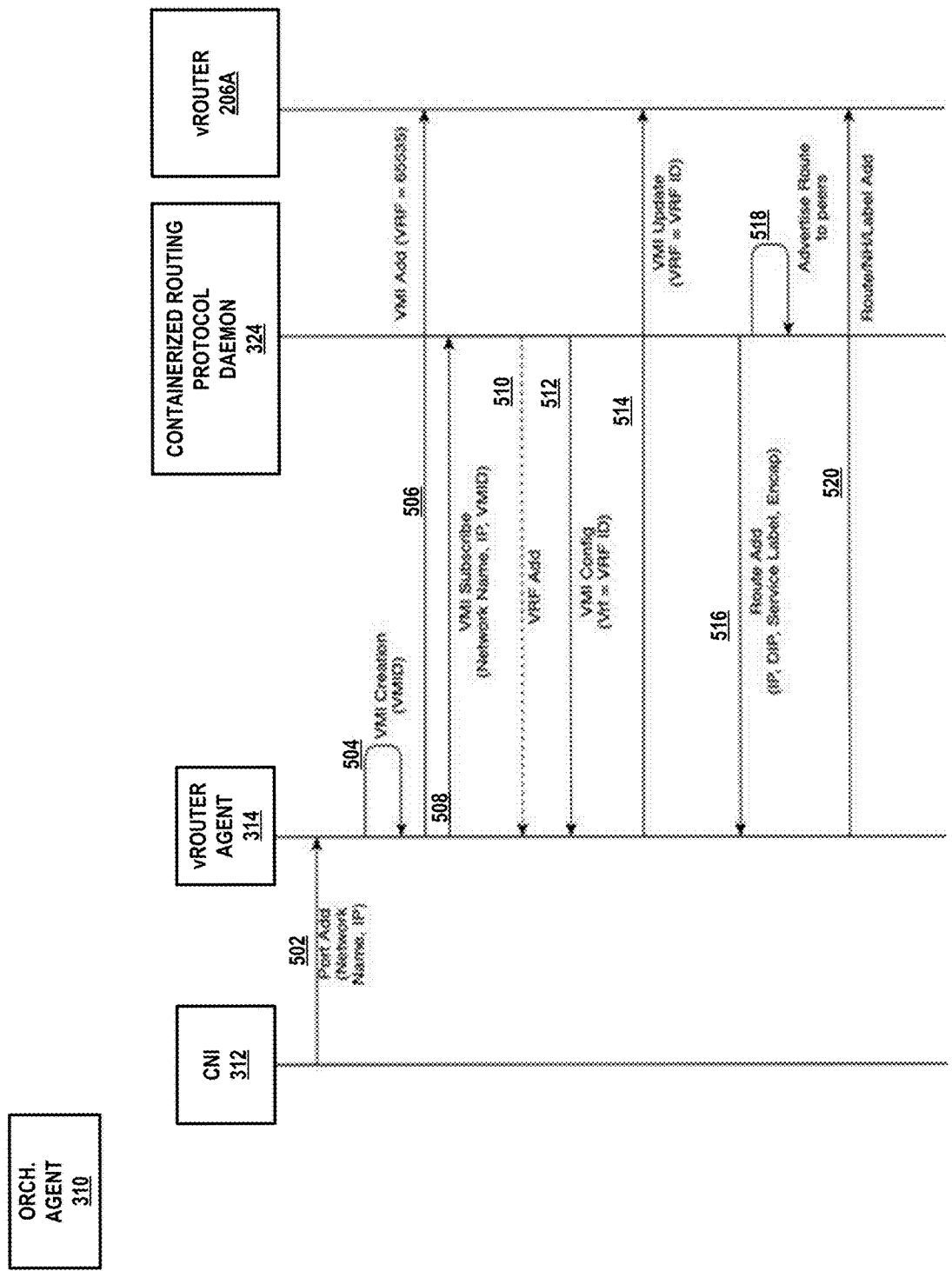
FIG. 5 is a conceptual diagram depicting a sequence of operations on a port-add leading to route programming in a virtual router, according to example aspects of this disclosure.

FIG. 5 is a conceptual diagram depicting a sequence of operations on a port-add leading to route programming in a virtual router, according to example aspects of this disclosure. The sequence of operations is described with respect to components of server 400, but may be performed by components of any server described in this disclosure, e.g., servers 12 of FIGS. 1A, 1B and 2, or server 400 of FIG. 4. CNI 312 has the IP address block reserved for Pods. Virtual router agent 314 listens for Port-Add and Port-Delete messages, e.g., on a thrift service, where a "port" corresponds to a virtual network interface. CNI 312 sends a Port-Add message to virtual router agent 314 (502). The Port-Add message includes an identifier for the virtual network for the port and an IP address allocated by CNI 312 for the Pod. (CNI 312 may separately configure the Pod with the other end of the virtual network interface.) virtual router agent 314 creates a virtual network interface (referred to here as a virtual machine interface or VMI, which is an example of a virtual network interface) in interfaces 540 (504). Virtual router agent 314 configures the virtual network interface in virtual router 206A with a default VRF identifier, with a VMI Add message (506). Virtual router agent 314 subscribes to cRPD 324 instead of an SDN controller with a VMI Subscribe message that includes the virtual network name and IP address received in the Port Add message (508). cRPD 327 sends a VMI Config message to virtual router agent 314 with the correct VRF identifier for virtual network for the virtual network interface (512), optionally adding a VRF to virtual router agent 314 if needed with a VRF Add message (510). Virtual router agent 314 send a VMI Update message with the correct VRF identifier to virtual router 206A to cause virtual router 206A, which attaches the virtual network interface to the correct VRF (514). cRPD 324 allocates a service label and adds a route and next-hop (e.g., an MPLS route for BGP IP-VPNs) using a Route Add message to virtual router agent 314 (516). cRPD 324 also advertises a route for reaching the Pod to its peer routers (518), which may include other cRPDs, routers in the underlay network, or other routers. Virtual router agent 314 configures virtual router 206A with forwarding information for the route received in the Route Add message from cRPD 324 (520).

Figure 6A:
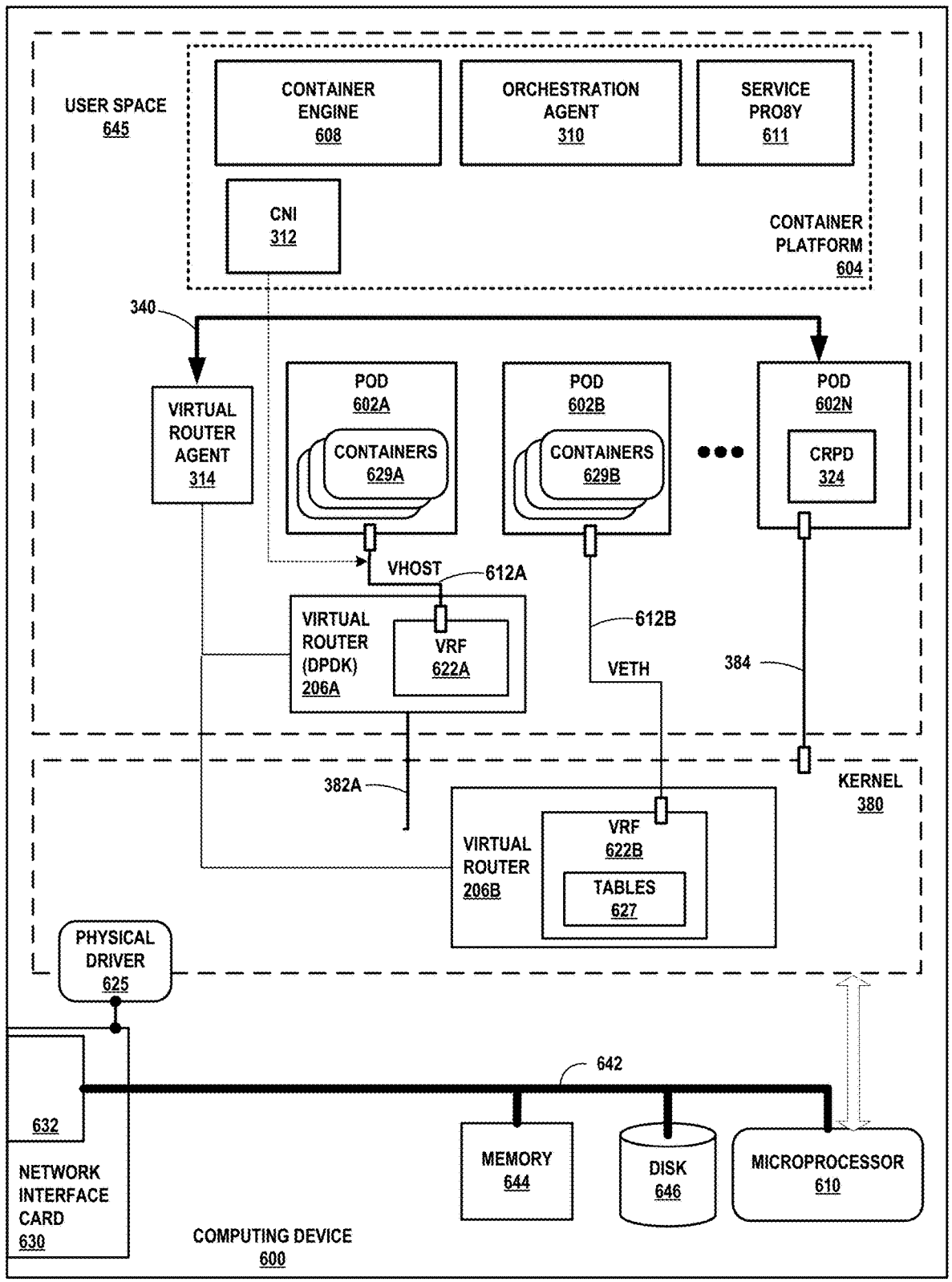
FIG. 6A is a block diagram of an example computing device (e.g., host), according to techniques described in this disclosure.

FIG. 6A is a block diagram of an example computing device (e.g., host), according to techniques described in this disclosure. Computing device 600 of FIG. 6A may represent a real or virtual server and may represent an example instance of any of servers 12 of FIGS. 1A and 1B, server 300 of FIG. 3 or server 400 of FIG. 4. Computing device 600 includes in this example, a bus 642 coupling hardware components of a computing device 600 hardware environment. Bus 642 couples network interface card (NIC) 630, storage disk 646, and one or more microprocessors 610 (hereinafter, "microprocessor 610"). NIC 630 may be SR-IOV-capable. A front-side bus may in some cases couple microprocessor 610 and memory device 644. In some examples, bus 642 may couple memory device 644, microprocessor 610, and NIC 630. Bus 642 may represent a Peripheral Component Interface (PCI) express (PCIe) bus. In some examples, a direct memory access (DMA) controller may control DMA transfers among components coupled to bus 642. In some examples, components coupled to bus 642 control DMA transfers among components coupled to bus 642.

Microprocessor 610 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 646 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 610.

Memory 644 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 644 provides a physical address space composed of addressable memory locations.

Network interface card (NIC) 630 includes one or more interfaces 632 configured to exchange packets using links of an underlying physical network. Interfaces 632 may include a port interface card having one or more network ports. NIC 630 may also include an on-card memory to, e.g., store packet data. Direct memory access transfers between the NIC 630 and other devices coupled to bus 642 may read/write from/to the NIC memory.

Memory 644, NIC 630, storage disk 646, and microprocessor 610 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 645.

Kernel 380 includes a physical driver 625 to use the network interface card 630. Network interface card 630 may also implement SR-IOV to enable sharing the physical network function (I/O) among one or more virtual execution elements, such as containers 629A-629B or one or more virtual machines (not shown in FIG. 6A). Shared virtual devices such as virtual functions may provide dedicated resources such that each of the virtual execution elements may access dedicated resources of NIC 630, which therefore appears to each of the virtual execution elements as a dedicated NIC. Virtual functions may represent lightweight PCIe functions that share physical resources with a physical function used by physical driver 625 and with other virtual functions. For an SR-IOV-capable NIC 630, NIC 630 may have thousands of available virtual functions according to the SR-IOV standard, but for I/O-intensive applications the number of configured virtual functions is typically much smaller.

Computing device 600 may be coupled to a physical network switch fabric that includes an overlay network that extends switch fabric from physical switches to software or "virtual" routers of physical servers coupled to the switch fabric, including virtual routers 206A and 206B (collectively, "virtual routers 206"). Virtual routers may be processes or threads, or a component thereof, executed by the physical servers, e.g., servers 12 of FIGS. 1A and 1B, server 300 of FIG. 3, and/or server 400 of FIG. 4, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 600 of FIG. 6A, virtual router 206A executes within user space as a DPDK-based virtual router and virtual router 206B executes in kernel 380 space. In some aspects, a virtual router may execute within a hypervisor, a host operating system, a host application, or a virtual machine in various implementations.

Virtual routers 206 may replace and subsume the virtual routing/bridging functionality of the Linux bridge/OVS module that is commonly used for Kubernetes deployments of pods, including pods 602A-602N (collectively, "pods 602"). In the example shown in FIG. 6A, pod 602A includes one or more application containers 629A and pod 602B includes one or more application containers 629B. Pod 602N includes an instance of cRPD 324.

Virtual routers 206 may perform bridging (e.g., E-VPN) and routing (e.g., L3VPN, IP-VPNs) for virtual networks. Virtual routers 206 may perform networking services such as applying security policies, NAT, multicast, mirroring, and load balancing.

In the example shown in FIG. 6A, virtual router 206A executes as a user space 656 as DPDK process. Virtual router agent 314 may also be executing in user space. In the example computing device 600 of FIG. 2, virtual router 206A executes within user space as a DPDK-based virtual router, but virtual router 206A may execute within a hypervisor, a host operating system, a host application, or a virtual machine in various implementations. Virtual router agent 314 has a connection to SDN controller 70 using a channel, which is used to download configurations and forwarding information. Virtual router agent 314 programs this forwarding state to the virtual router data (or "forwarding") plane represented by virtual router 206A, and virtual router 206B. Virtual router 206A and virtual router agent 314 may be processes.

Virtual routers 206 may be multi-threaded and execute on one or more processor cores. Virtual router 206 may include multiple queues. Virtual router 206 may implement a packet processing pipeline. The pipeline can be stitched by the corresponding virtual router agent 314 from the simplest to the most complicated manner depending on the operations to be applied to a packet. Virtual routers 206 may maintain multiple instances of forwarding bases. Virtual routers 206 may access and update tables (e.g., tables 627) using RCU (Read Copy Update) locks.

To send packets to other compute nodes or switches, virtual router 206A uses one or more physical interfaces 632. In general, a virtual router 206 exchanges overlay packets with workloads, such as VMs or pods 602. A virtual router 206 may have multiple virtual network interfaces (e.g., vifs). These interfaces may include the kernel interface, vhost0, for exchanging packets with the host operating system; an interface with a corresponding virtual router agent 314, pkt0, to obtain forwarding state from the network controller and to send up exception packets. There may be one or more virtual network interfaces corresponding to the one or more physical network interfaces 632.

Other virtual network interfaces of virtual router 206 may be used for exchanging packets with the workloads. Such virtual network interfaces may be any of the aforementioned types of virtual interfaces. In some cases, the virtual network interfaces 612 may be tap interfaces.

Virtual router 206B is a kernel-based virtual router. In this case, virtual router 206B is installed as a kernel module inside the operating system. Virtual router 206B registers itself with the TCP/IP stack to receive packets from any of the desired operating system interfaces that it wants to. The interfaces can be bond, physical, tap (for VMs), veth (for containers) etc. In the example shown in FIG. 6A, virtual router 206B has a veth interface with vRF 622B of virtual router 206B. Virtual router 206B in this mode relies on the operating system to send and receive packets from different interfaces. For example, the operating system may expose a tap interface backed by a vhost-net driver to communicate with VMs. Once virtual router 206B registers for packets from this tap interface, the TCP/IP stack sends all the packets to it. Virtual router 206B sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 206A as shown in FIG. 6A, virtual router 206A is installed as a user space 645 application that is linked to a DPDK library. This may lead to faster performance than a kernel-based deployment, particularly in the presence of high packet rates. The physical interfaces 632 are used by the poll mode drivers (PMDs) of DPDK rather the kernel's interrupt-based drivers. The registers of physical interfaces 632 may be exposed into user space 645 in order to be accessible to the PMDs; a physical interface 632 bound in this way is no longer managed by or visible to the host operating system, and the DPDK-based virtual router 206A manages the physical interface 632. This includes packet polling, packet processing, and packet forwarding. In other words, user packet processing steps are performed by the virtual router 206A DPDK data plane. The nature of this "polling mode" makes the virtual router 206A DPDK data plane packet processing/forwarding much more efficient as compared to the interrupt mode when the packet rate is high. There are comparatively few interrupts and context switching during packet I/O, compared to kernel-mode virtual router 206A, and interrupt and context switching during packet I/O may in some cases be avoided altogether.

In general, each of pods 602 may be assigned one or more virtual network addresses for use within respective virtual networks, where each of the virtual networks may be associated with a different virtual subnet provided by a virtual router 206. Pod 602B may be assigned its own virtual layer three (L3) IP address, for example, for sending and receiving communications but may be unaware of an IP address of the computing device 600 on which the pod 602B executes. The virtual network address may thus differ from the logical address for the underlying, physical computer system, e.g., computing device 600.

Virtual router agents 314 control the overlay of virtual networks for computing device 600 and that coordinates the routing of data packets within computing device 600. In general, virtual router agents 314A and 314B communicate with SDN controller 70 (FIGS. 1A, 1B and 2) for the virtualization infrastructure, which generates commands to create virtual networks and configure network virtualization endpoints, such as computing device 600 and, more specifically, a corresponding virtual router 206A and 206B, as well as virtual network interfaces 612A and 612B. By configuring virtual router 206A based on information received from SDN controller 70, virtual router agent 314 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 629A within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 206A. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 206A performs tunnel encapsulation/decapsulation for packets sourced by/destined to any containers of pods 602, and virtual router 206A exchanges packets with pods 602 via bus 642 and/or a bridge of NIC 630.

As noted above, a SDN controller 70 may provide a logically centralized controller for facilitating operation of one or more virtual networks. SDN controller 70 may, for example, maintain a routing information base, e.g., one or more routing tables that store routing information for the physical network as well as one or more overlay networks. Virtual routers 206 implement one or more virtual routing and forwarding instances (VRFs) 622A-622B for respective virtual networks for which the corresponding virtual router 206 operates as respective tunnel endpoints. In general, each VRF 622 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 622 may include a network forwarding table storing routing and forwarding information for the virtual network.

NIC 630 may receive tunnel packets and forward the tunnel packets to the appropriate virtual router. As an example, virtual router 206A processes the tunnel packet to determine, from the tunnel encapsulation header, the virtual network of the source and destination endpoints for the inner packet. Virtual router 206A may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 622A. VRF 622A may include forwarding information for the inner packet. For instance, VRF 622A may map a destination layer 3 address for the inner packet to virtual network interface 212. VRF 622A forwards the inner packet via virtual network interface 212 to POD 602A in response.

Pod 602A includes one or more application containers 629A and pod 602B includes one or more application containers 629B. Containers such as containers 629A or 629B may also source inner packets as source virtual network endpoints. Container 629A, for instance, may generate a layer 3 inner packet destined for a destination virtual network endpoint that is executed by another computing device (i.e., not computing device 600) or for another one of containers. Container 629A may sends the layer 3 inner packet to virtual router 206A via virtual network interface 212 attached to VRF 622A.

Virtual router 206A receives the inner packet and layer 2 header and determines a virtual network for the inner packet. Virtual router 206A may determine the virtual network using any of the above-described virtual network interface implementation techniques (e.g., macvlan, veth, etc.). Virtual router 206A uses the VRF 622A corresponding to the virtual network for the inner packet to generate an outer header for the inner packet, the outer header including an outer IP header for the overlay tunnel and a tunnel encapsulation header identifying the virtual network. Virtual router 206A encapsulates the inner packet with the outer header. Virtual router 206A may encapsulate the tunnel packet with a new layer 2 header having a destination layer 2 address associated with a device external to the computing device 600, e.g., a TOR switch 116 (FIG. 1B) or one of servers 12. If external to computing device 600, virtual router 206A outputs the tunnel packet with the new layer 2 header to NIC 630. NIC 630 outputs the packet on an outbound interface. If the destination is another virtual network endpoint executing on computing device 600, virtual router 206A routes the packet to the appropriate one of virtual network interfaces 212 (FIG. 2).

In some examples, a controller for computing device 600 (e.g., SDN controller 70) of FIGS. 1A, 1B and 2) configures a default route in each of pods 602 to cause the pods to use a virtual router (e.g., virtual routers 206A and 206B) as an initial next hop for outbound packets.

Container platform 604 includes container engine 608, orchestration agent 310, service proxy 611, and CNI 312. Container engine 608 includes code executable by microprocessor 610. Container runtime 608 may be one or more computer processes. Container engine 608 runs containerized applications in the form of containers 629A-629B. Container engine 608 may represent a Dockert, rkt, or other container engine for managing containers. In general, container engine 608 receives requests and manages objects such as images, containers, networks, and volumes. An image is a template with instructions for creating a container. A container is an executable instance of an image. Based on directives from orchestration agent 310, container engine 608 may obtain images and instantiate them as executable containers in pods 602A-602B.

Service proxy 611 includes code executable by microprocessor 610. Service proxy 611 may be one or more computer processes. Service proxy 611 monitors for the addition and removal of service and endpoints objects, and it maintains the network configuration of the computing device 600 to ensure communication among pods and containers, e.g., using services. Service proxy 611 may also manage iptables to capture traffic to a service's virtual IP address and port and redirect the traffic to the proxy port that proxies a backed pod. Service proxy 611 may represent a kube-proxy for a minion node of a Kubernetes cluster. In some examples, container platform 604 does not include a service proxy 611 or the service proxy 611 is disabled in favor of configuration of virtual router 206A and pods 602 by CNI 312.

Orchestration agent 310 includes code executable by microprocessor 610. Orchestration agent 310 may be one or more computer processes. Orchestration agent 310 may represent a kubelet for a minion node of a Kubernetes cluster. Orchestration agent 310 is an agent of an orchestrator, e.g., orchestrator 50 of FIGS. 1A, 1B and 2, that receives container specification data for containers and ensures the containers execute by computing device 600. Container specification data may be in the form of a manifest file sent to orchestration agent 310 from orchestrator 50 or indirectly received via a command line interface, HTTP endpoint, or HTTP server. Container specification data may be a pod specification (e.g., a PodSpec—a YAML (Yet Another Markup Language) or JSON object that describes a pod) for one of pods 602 of containers 629. Based on the container specification data, orchestration agent 310 directs container engine 608 to obtain and instantiate the container images for containers 629, for execution of containers 629 by computing device 600.

Orchestration agent 310 instantiates or otherwise invokes CNI 312 to configure one or more virtual network interfaces for each of pods 602. For example, orchestration agent 310 receives a container specification data for pod 602A and directs container engine 608 to create the pod 602A with containers 629A based on the container specification data for pod 602A. Orchestration agent 310 can also receive a container specification data for pod 602B and directs container engine 608 to create the pod 602B with containers 629B based on the container specification data for pod 602B. Orchestration agent 310 also invokes the CNI 312 to configure, for pod 602A, virtual network interface 612A for a virtual network corresponding to VRFs 622A, and for pod 602B, virtual network interface 612B for a virtual network interface corresponding to VRFs 622B. In this example, pod 602A is a virtual network endpoint for a virtual network corresponding to VRF 622A and pod 602B is a virtual network endpoint for a virtual network corresponding to VRF 622B.

CNI 312 may obtain interface configuration data for configuring virtual network interfaces for pods 602. Virtual router agents 314A and 314B operate as virtual network control plane modules for enabling SDN controller 70 to configure virtual routers 206A and 206B respectively. Unlike the orchestration control plane (including the container platforms 604 for minion nodes and the master node(s), e.g., orchestrator 50), which manages the provisioning, scheduling, and managing virtual execution elements, a virtual network control plane (including SDN controller 70 and virtual router agents 314 for minion nodes) manages the configuration of virtual networks implemented in the data plane in part by virtual routers of the minion nodes. Virtual router agents 314 communicate, to CNI 312, interface configuration data for virtual network interfaces to enable an orchestration control plane element (i.e., CNI 312) to configure the virtual network interfaces according to the configuration state determined by the SDN controller 70, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

Figure 6B:
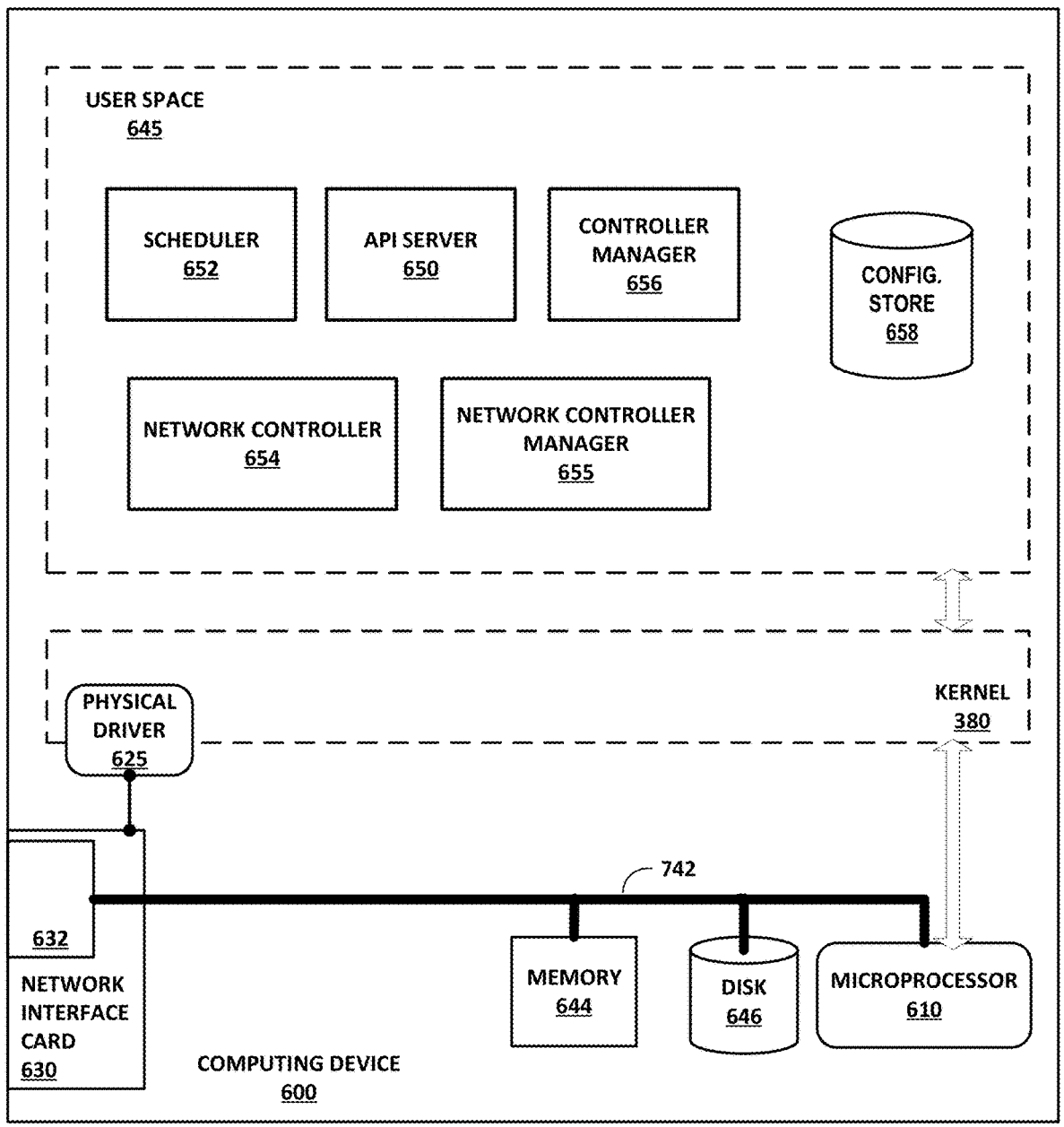
FIG. 6B is a block diagram of the example computing device of FIG. 6A operating as an instance of an orchestrator master node for a cluster for a virtualized computing infrastructure.

FIG. 6B is a block diagram of the example computing device of FIG. 6A operating as an instance of an orchestrator master node for a cluster for a virtualized computing infrastructure. In this example, computing device 600 may represent one or more real or virtual servers. As such, computing device 600 may in some instances implement one or more master nodes for respective clusters. In the example shown in FIG. 6B, computing devices includes scheduler 652, API server 650, network controller manager 656, network controller 654, network controller manager 655, and configuration store 658

Scheduler 652, API server 650, network controller manager 656, network controller 654, network controller manager 655, and configuration store 658, although illustrated and described as being executed by a single computing device 600, may be distributed among multiple computing devices 600 that make up a computing system or hardware/server cluster. Each of the multiple computing devices 600, in other words, may provide a hardware operating environment for one or more instances of any one or more of scheduler 652, API server 650, network controller manager 656, network controller 654, network controller manager 655, or configuration store 658. Network controller 654 may represent an example instance of SDN controller 70 of FIGS. 1A, 1B and 2. Scheduler 652, API server 650, controller manager 656, and network controller manager 655 may implement an example instance of orchestrator 50. Network controller manager 655 may represent an example implementation of a Kubernetes cloud controller manager or Kube-manager. Network controller 654 may represent an example instance of SDN controller 70.

API server 650, scheduler 652, controller manager 656, and configuration store may implement a master node for a cluster and be alternatively referred to as "master components." The cluster may be a Kubernetes cluster and the master node a Kubernetes master node, in which case the master components are Kubernetes master components.

API server 650 includes code executable by microprocessor 610. API server 650 may be one or more computer processes. API server 650 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 650 may implement a Representational State Transfer (REST) interface to process REST operations and provide the frontend to a corresponding cluster's shared state stored to configuration store 658. API server 650 may authenticate and authorize requests. API server 650 communicates with other components to instantiate virtual execution elements in the computing infrastructure 8. API server 650 may represent a Kubernetes API server.

Configuration store 658 is a backing store for all cluster data. Cluster data may include cluster state and configuration data. Configuration data may also provide a backend for service discovery and/or provide a locking service. Configuration store 658 may be implemented as a key value store. Configuration store 658 may be a central database or distributed database. Configuration store 658 may represent an etcd store. Configuration store 658 may represent a Kubernetes configuration store.

Scheduler 652 includes code executable by microprocessor 610. Scheduler 652 may be one or more computer processes. Scheduler 652 monitors for newly created or requested virtual execution elements (e.g., pods of containers) and selects a minion node on which the virtual execution elements are to run. Scheduler 652 may select a minion node based on resource requirements, hardware constraints, software constraints, policy constraints, locality, etc. Scheduler 652 may represent a Kubernetes scheduler.

In general, API server 650 may invoke the scheduler 652 to schedule a virtual execution element, which may select a minion node and returns an identifier for the selected minion node to API server 650, which may write the identifier to the configuration store 658 in association with the virtual execution element. API server 650 may invoke the orchestration agent 310 (FIG. 6A) for the selected minion node, which may cause the container engine 608 (FIG. 6A) for the selected minion node to obtain the virtual execution element from a storage server and create the virtual execution element on the minion node. The orchestration agent 310 for the selected minion node may update the status for the virtual execution element to the API server 650, which persists this new state to the configuration store 658. In this way, computing device 600 instantiates new virtual execution elements in the computing infrastructure 100, 108 (FIGS. 1A and 1B).

Controller manager 656 includes code executable by microprocessor 610. Controller manager 656 may be one or more computer processes. Controller manager 656 may embed the core control loops, monitoring a shared state of a cluster by obtaining notifications from API Server 650. Controller manager 656 may attempt to move the state of the cluster toward the desired state. Example controllers (not shown) managed by the controller manager 656 may include a replication controller, endpoints controller, namespace controller, and service accounts controller. Controller manager 656 may perform lifecycle functions such as namespace creation and lifecycle, event garbage collection, terminated pod garbage collection, cascading-deletion garbage collection, node garbage collection, etc. Controller manager 656 may represent a Kubernetes Controller Manager for a Kubernetes cluster.

Network controller 654 includes code executable by microprocessor 610. Network controller 654 may include one or more computer processes. Network controller 654 may represent an example instance of SDN controller 70 of FIGS. 1A and 1B. The network controller 654 may be a logically centralized but physically distributed SDN controller that is responsible for providing the management, control, and analytics functions of a virtualized network. In particular, network controller 654 may be a logically centralized control plane and management plane of the computing infrastructure 100, 108 and orchestrates virtual routers for one or more minion nodes.

Network controller 654 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 654 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 654 programs network infrastructure elements to create virtual networks and may create interface configurations for virtual network interfaces for the virtual networks.

Additional information regarding an example network controller is found in International Application Number PCT/US2013/044378 and in U.S. patent application Ser. No. 14/226,509, incorporated by reference above.

Network controller manager 655 includes code executable by microprocessor 610. Network controller manager 655 may be one or more computer processes. Network controller manager 655 operates as an interface between the orchestration-oriented elements (e.g., scheduler 652, API server 650, controller manager 656, and configuration store 658) and network controller 654. In general, network controller manager 655 monitors the cluster for new objects (e.g., pods and services). Network controller manager 655 may isolate pods in virtual networks and connect pods with services.

Network controller manager 655 may be executed as a container of the master node for a cluster. In some cases, using network controller manager 655 enables disabling the service proxies of minion nodes (e.g., the Kubernetes kube-proxy) such that all pod connectivity is implemented using virtual routers, as described herein.

Network controller manager 655 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 655 may create a network solution for the application using an interface to network controller 654 to define network objects such as virtual networks, virtual network interfaces, and access control policies. Network controller 654 may implement the network solution in the computing infrastructure by, e.g., configuring the one or more virtual network and virtual network interfaces in the virtual routers.

Figure 7:
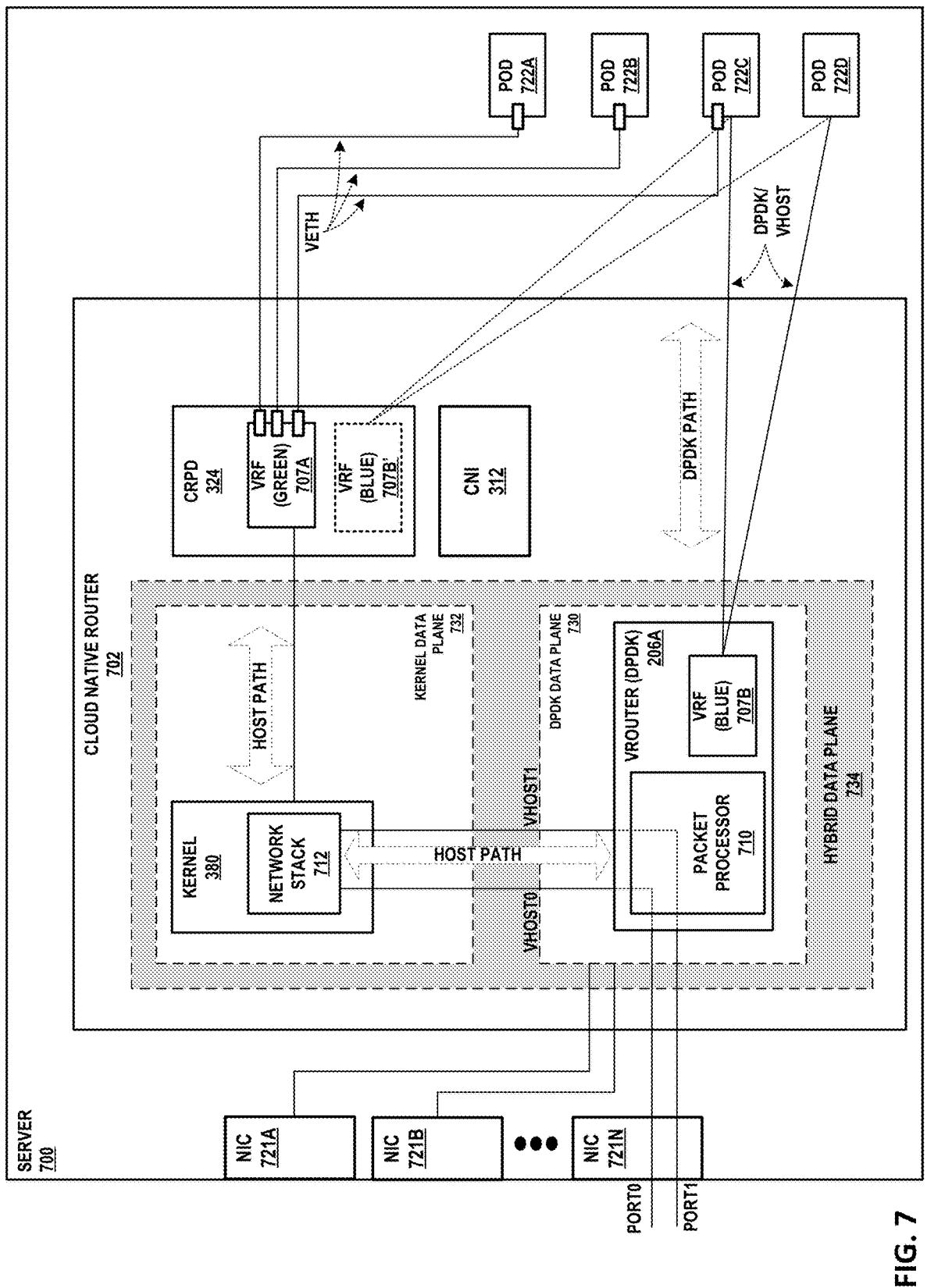
FIG. 7 is a block diagram of an example computing device (e.g., server) that includes a hybrid data plane, according to techniques described in this disclosure.

FIG. 7 is a block diagram of an example computing device (e.g., server) that includes a hybrid data plane, according to techniques described in this disclosure. In the example shown in FIG. 7, server 700 includes network interfaces 721A-721N (collectively "network interfaces 721"), kernel 380, DPDK virtual router 206A, CNI 312, and cRPD 704. Server 700 may be an implementation of any of servers 12, 300, 400, and 600 of FIGS. 1A, 1B, 2, 3, 4, 6A and 6B. Additionally, in this example, server 700 hosts pods 722A-722D (collectively, "pods 722"). Kernel 380, DPDK virtual router 206A, CNI 312, and cRPD 704 may be combined in an implementation of Cloud Native Router 702.

Cloud native router 702 includes a hybrid data plane 734 that incorporates kernel data plane 732 and DPDK data plane 730. Hybrid data plane 734 may be an implementation of hybrid data plane 150 of FIG. 1B. Kernel data plane 732 is implemented by kernel 380 and network stack 712. In some aspects, kernel 380 may include a virtual router module (not shown in FIG. 7) that is part of kernel data plane 732. DPDK data plane 730 is implemented by virtual router 206A.

NICs 721 may be implementations of NICs 321 (FIGS. 3 and 4) and/or NIC 630 (FIGS. 6A and 6B). In some aspects, each of NICs 721 is assigned to DPDK data plane 734, and none of NICs 721 are assigned to kernel data plane 732.

In some aspects, a K8s node on server 700 is modeled as a PE router, and each pod is modeled as a CE router. cRPD 324 may be configured to run in "host mode." Pods 722 may be linked to hybrid data plane 734 via one or both of kernel data plane 732 and DPDK data plane 734. In the example illustrated in FIG. 7, pods 722A and 722B are linked to kernel data plane 732 via VRF 707A of CRPD 324. Pod 722D is linked to virtual router 206A of DPDK data plane 734. A pod 722 can be modeled as a multihomed CE, that is, a pod can be connected to multiple VRFs. Further, the VRFs may be in different data planes of hybrid data plane 734. In the example shown in FIG. 7, pod 722C is multihomed, and is linked to both kernel data plane 732 via VRF 707A and virtual router 206A of DPDK data plane 734 via VRF 707B.

In response to orchestrator 50 (FIGS. 1A and 1B) creating a pod 722, cRPD 324 dynamically creates one or more virtualized network interfaces. For example, when orchestrator 50 creates a pod that is configured to use kernel data plane 732, cRPD 324 can create a veth pair communicatively coupling the pod to a VRF of cRPD 324. cRPD 324 terminates one end of the veth link at the pod, other end is terminated inside a VRF on cRPD 324. In the example shown in FIG. 7, when orchestrator 50 crates pods 722A-722C, cRPD 324 creates a veth pair between the respective pod and VRF 707A. Because cRPD 324 has access to kernel 380 interfaces and network stack 712, various routing protocols may be used between pods 722A-722C and cRPD 324. Examples of such protocols include E-BGP, IS-IS, and OSPF. Additionally, cRPD 324 can utilize kernel 380 and network stack 712 to apply various types of network overlays. Examples of such overlays include L3VPN, E-VPN (Type-2/Type-5) using different underlays/tunneling: MPLS, SR-MPLS, SRv6, MPLS over UDP/IPIP/GRE tunnels, etc. Additionally, cRPD 324 can utilize kernel 380 and network stack 712 to provide support for protocols such as IPsec, SRv6, IP-IP, etc. Further, the elements of kernel data plane 732 provide support for applications and workloads that utilize kernel 380's native networking APIs (e.g., BSD sockets).

In response to orchestrator 50 creating a pod that is configured to use the DPDK data plane, cRPD 324 can create a vHost interface communicatively coupling the pod to a VRF of a DPDK-based virtual router of DPDK data plane 730. In the example shown in FIG. 7, when orchestrator 50 creates pods 722C and 722D, cRPD 324 creates a vhost interface between the respective pod and VRF 707B of DPDK-based virtual router 206A.

In some aspects, cRPD 324 creates VRFs/routing-instances for interfaces in kernel data plane 732 that are separate from the VRFs/routing-instances that cRPD 324 creates for interfaces in DPDK data plane 730. For instance, in the example shown in FIG. 7, cRPD 324 creates VRF 707A for kernel data plane 732, and VRF 707B for virtual router 707B in DPDK data plane 734.

Additionally, cRPD 324 can create a vhost interface for each network interface port that has been assigned to virtual router 206A. As an example, NIC 721N assigned to virtual router 206A has two ports: port0 and port1. cRPD 324 creates two vhost interfaces, vhost0 and vhost1, that correspond to port0 and port1 respectively.

A network packet that originates at one of pods 722 can be referred to as an "outbound packet." Outbound packets that are transmitted to VRF 707A (e.g., outbound packets from pods 722A, 722B, and the veth interface of pod 722C) are directed to a kernel interface (e.g., a veth interface of cRPD 324). In such cases, route lookup and encapsulation can be performed in kernel 380 and/or network stack 712. Kernel 380 and network stack 712 create a fully formed L2 packet for the outbound packet that is then handed over to DPDK data plane 730 via a vhost interface. Packet processor 710 of virtual router 206A transmits the packet via a NIC 721 (NIC 721N in the example of FIG. 7). In some aspects, packet processor 710 does not perform any network processing of packets received from network stack 712 and/or kernel 380 other than to transmit the outbound packet via a NIC 721, and thus acts as a "pass-through" entity.

Outbound packets that are transmitted from a pod configured to use DPDK are provided directly to VRF 707B in the example shown in FIG. 7. In this example, pods 722D and 722D are each configured to use DPDK. In this case, virtual router 206A performs standard DPDK processing for the outbound packets and creates packets for transmission via a NIC 721 (NIC 721N in the example of FIG. 7).

A network packet that is received by one of network interfaces 721 that originates from a network source outside of server 700 can be referred to as an "inbound packet." Because all network interfaces of server 700 are assigned to DPDK data plane 730, an inbound packet will be received at a DPDK-based virtual router. In the example of FIG. 7, inbound packets for one of pods 722 are received by virtual router 206A. Packet processor 710 of virtual router 206A can examine an inbound packet and use various criteria to determine if the packet requires kernel-based processing or not. Packet processor 710 operates as a "pass-through" for packets that it determines require kernel-based processing. Packet processor 710 delivers such packets to network stack 712 for delivery to the appropriate VRF. In the example shown in FIG. 7, packet processor 710 does not perform any network processing of inbound packets having a destination of pods 722A, 722B, and the veth interface of pod 722C other than to pass the inbound packet to network stack 712 for processing and delivery to VRF 707A.

cRPD 324 can install forwarding state in both kernel data plane 732 and DPDK data plane 734 for DPDK-based virtual routers. For example, cRPD 324 creates a logical representation of VRFs that are created for the DPDK data plane that have substantially the same routing tables as corresponding DPDK VRFs. In the example of FIG. 7, VRF 707B' is a logical representation of VRF 707B, and includes substantially the same routing tables as VRF 707B with minor differences. For example, the routing tables for VRF 707B and 707B' can contain same set of route entries/prefixes, but will have different values in the next-hop fields for the routes/prefixes handled by the kernel data-plane. For such entries, VRF7 707B has a routing table entry that has a next-hop value that instructs the packet to be delivered to kernel. For the same prefix, VRF 707B' has a routing table entry with a next-hop value that indicates how kernel 380 is to decapsulate the packet and perform lookup in the routing table of VRF 707B'. Thus, for packets having destination address indicating that the packet is to be processed by kernel 380, cRPD 324 may program the routing table of VRF 707B to set the next hop to an interface of kernel 380 (e.g., vhost0 or vhost1), indicating that packet processor 710 should forward the packet to kernel 380, for example via the vhost interface. When kernel 380 receives a packet via the vhost interface, it can determine that the next-hop field in the routing table entry associated with the destination address is the loop-back address, indicating that the kernel should process the inbound packet.

Packet processor 710 can perform standard DPDK processing for inbound packets having a destination that indicates a VRF in DPDK data plane 730. For example, packet processor 710 can perform DPDK processing for inbound packets having a destination of the vhost interface of pod 722C or of pod 722D.

Figure 8A:
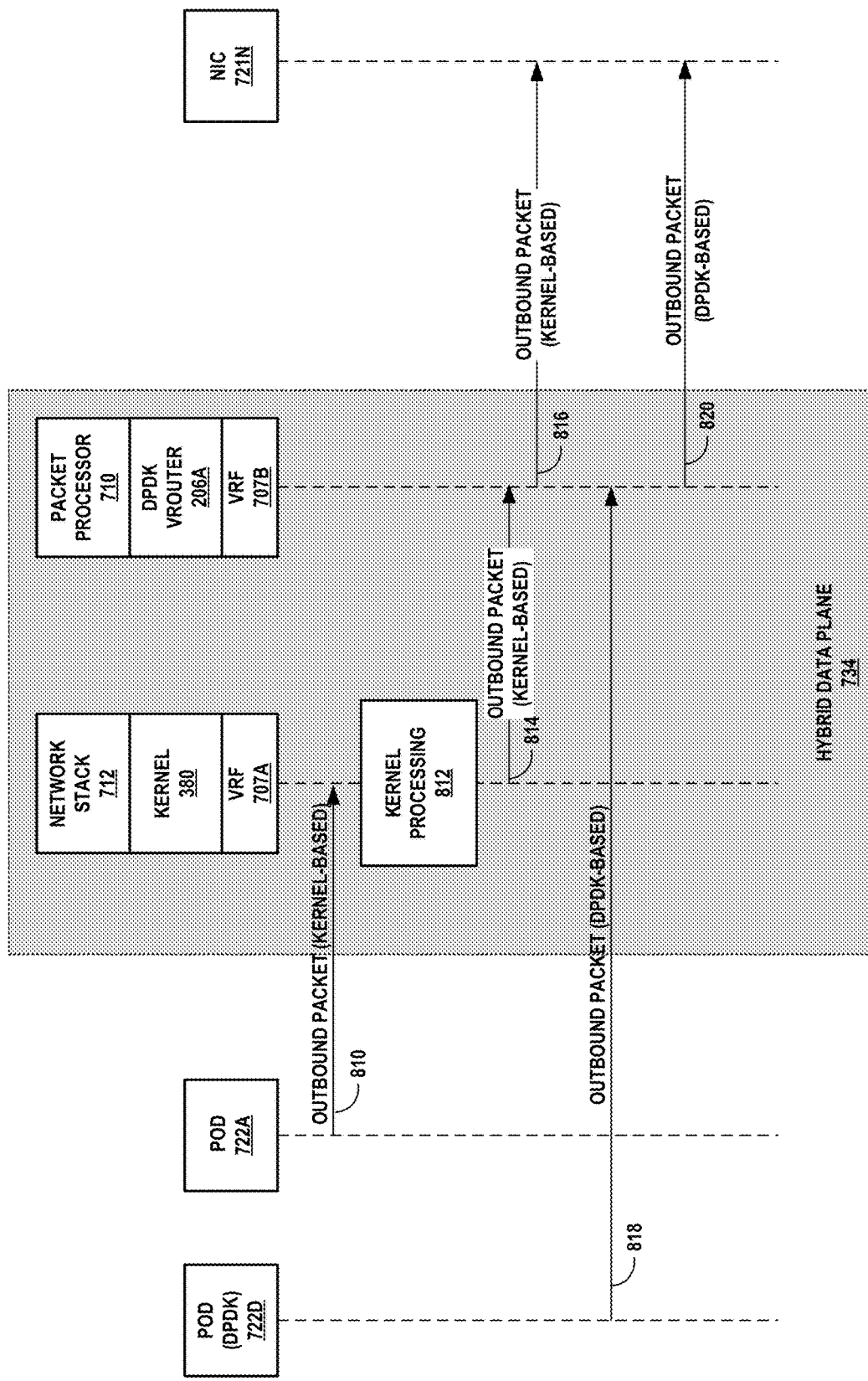
FIGS. 8A and 8B are sequence diagrams illustrating example processing of outbound and inbound packets, in accordance with techniques of the disclosure.
Figure 8B:
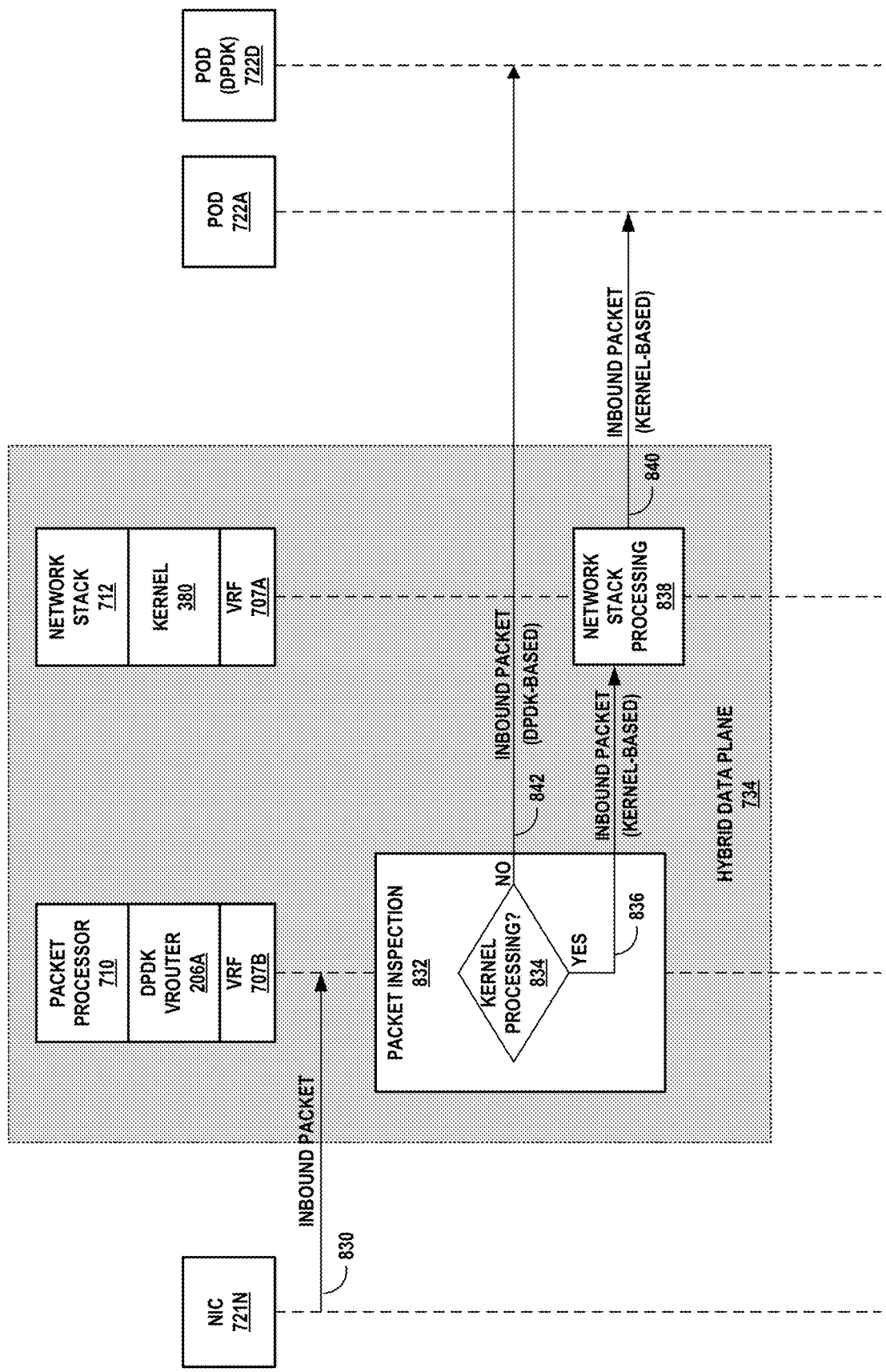

FIGS. 8A and 8B are sequence diagrams illustrating example processing of outbound and inbound packets, in accordance with techniques of the disclosure. FIGS. 8A and 8B will be discussed in the context of the Cloud Native Router 702 shown in FIG. 7. In the examples shown in FIGS. 8A and 8B, two pods 722A and 722D send and receive network packets. Pod 722D is configured to utilize DPDK-based networking. Based on this configuration, cRPD 324 configures a vhost connection to communicatively couple pod 722D to VRF 707B. Pod 722A is configured to use kernel-based networking. Based on this configuration, cRPD 324 configures a veth pair to communicatively couple pod 722A to VRF 707A.

FIG. 8A is an example sequence diagram illustrating example processing of outbound packets, in accordance with techniques of the disclosure. In the example shown in FIG. 8A, pods 722A and 722D each transmit an outbound packet. Pod 722A transmits an outbound packet at operation 810. Pod 722A is configured to use the kernel data plane, and thus the outbound packet will be referred to as a kernel-based outbound packet. VRF 707A receives the outbound packet, and at operation 812, kernel 380 and/or network stack 712 process the outbound packet. Such processing may include LAUNDRY LIST. After the processing at operations 812, the kernel-based outbound packet will be a fully formed L2 packet. At operation 814, network stack 712 forwards the packet to DPDK virtual router 206A via a vhost interface. Packet processor 710 of virtual router 206A receives the kernel-based outbound packet (as encapsulated by network stack 712), and because the packet virtual router receives the packet via the vhost interface between itself and network stack 712, virtual router 206A, does not perform any processing of the packet other than to forward the kernel-based outbound packet to the corresponding physical port at operation 816. As an example, if virtual router 206A receives a packet from network stack 712 via the vhost1 interface, packet processor 710 will act as a pass-through device and forward the packet to NIC 721N for transmission via port1 (the port corresponding to vhost1).

Pod 722D transmits an outbound packet at operation 818. Pod 722D is configured to use the DPDK data plane, and thus the outbound packet will be referred to as a DPDK-based outbound packet. VRF 707B of virtual router 206A can receive the outbound packet via a vhost interface or via DPDK APIs. Virtual router 206A performs DPDK based processing of the packet and forwards the DPDK-based outbound packet to NIC 721N at operation 820.

Operations 810-820 may be performed in a different order than that shown in FIG. 8A. For example, pod 722D may transmit an outbound packet before pod 722A. Further, operations shown in FIG. 8A may take place concurrently.

FIG. 8B is an example sequence diagram illustrating example processing of an inbound packet, in accordance with techniques of the disclosure. In the example shown in FIG. 8B, an inbound packet is received by NIC 721N. As noted above, each of NICs 721 are assigned to the DPDK data plane. Thus, at operation 830, NIC 721N provides the inbound packet to virtual router 206A. Packet inspector 710 performs packet inspection 832 to determine if the inbound packet has a DPDK-based pod as a destination, or if the inbound packet is to be provided to kernel 380 for further processing or if the packet is to be processed by virtual router 206A (384). Packet inspector 710 can use various rules and heuristics to determine if an inbound packet is to be provided to kernel 380 for further processing. For example, in some aspects, packet inspector 710 may determine an encapsulation type for the packet, and provide the packet to kernel 380 for processing if the encapsulation type is one that is not supported by DPDK-based virtual router. Examples of such encapsulations include IP-IP, VX-LAN, GRE, MPLS, EVPN, IPsec, SRV6 etc. As an example, packet processor 710 may establish an "deliver-to-host path" that specifies a vhost interface (e.g., vhost0 or vhost1 in the example of FIG. 7) that packet processor 710 is to use when packets have encapsulations that require kernel-based processing.

In some aspects, packet processor can determine to forward a packet to kernel 380 based on the destination address. As described above, a routing table in virtual router 206A may be programmed to set the next-hop address to kernel 380. In this case, the packet is forwarded to kernel 380 for further processing.

In some aspects, packet processor 710 may determine that it does not know how to handle the packet. In this case, packet processor 710 may forward the packet to kernel 380 on the assumption that kernel 380 will know how to handle the packet. As an example, packet processor 710 may establish an "exception-to-host path" that specifies a vhost interface (e.g., vhost0 or vhost1 in the example of FIG. 7) that packet processor 710 is to use when encountering packets it does not know how to handle. For example, the "exception-to-host" path may be used to forward a packet for kernel-based processing if packet processor 710 encounters a label in a packet header that it does not know how to handle.

If packet inspector 710 determines that the packet is to be provided to kernel 380, then at operation 836 ("YES" branch of 834), packet processor 710 provides the inbound packet to network stack 712 of kernel 380 for further processing (838) by kernel 380 using network stack 712. In this case, packet processor 710 does not perform any processing on the inbound packet other than to forward the packet to kernel 380. For example, DPDK processing operations of virtual router 206A are bypassed, and any TTL values for the inbound packet are not modified.

If packet inspector 710 determines that the packet has a DPDK pod as a destination and does not require kernel processing, ("NO" branch of 834), virtual router 206A performs standard DPDK packet processing and at operation 842, provides the packet to DPDK-based pod 722D using a vhost interface or DPDK APIs.

FIG. 9 is an example deployment specification for a pod, in accordance with techniques of the disclosure. The example shown in FIG. 9 is in the YAML Ain't Markup Language (YAML) format. In the example shown in FIG. 9, a pod named "odu-pod1" is to be connected to two networks upon creation. A first network definition 902 indicates that a first interface "net1" is to be used to connect the pod to a network named "vswitch-pod1-bd100." The "dataplane" field has a value of "linux" indicating that this interface is to be created for a kernel data plane (e.g., a linux kernel data plane). A second definition 904 A first network definition 902 indicates that a second interface "net2" is to be used to connect the pod to a network named "vswitch-pod1-bd200." The "dataplane" field has a value of "DPDK" indicating that the pod supports DPDK communication and that this interface is to be created for a DPDK data plane.

Figure 10:
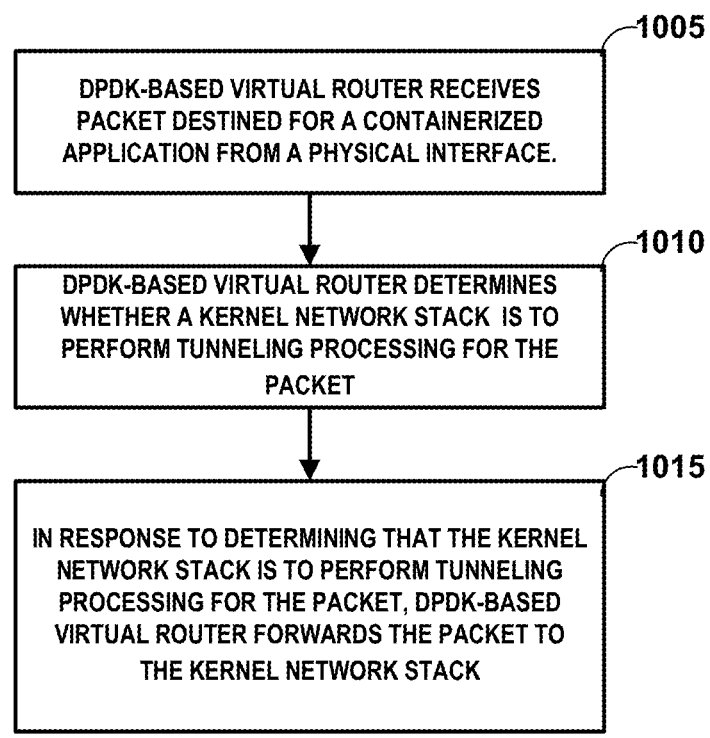
FIG. 10 is a flow diagram illustrating operations of a DPDK-based virtual router.

FIG. 10 is a flow diagram illustrating operations of a DPDK-based virtual router. A data plane development kit (DPDK)-based virtual router receives, from a physical interface, a packet destined for a containerized application (1005). The DPDK-based virtual router determines whether a kernel network stack executed by the processing circuitry is to perform tunneling processing for the packet (1010). In response to determining that the kernel network stack is to perform tunneling processing for the first packet, the DPDK-based virtual router forwards the packet to the kernel network stack (1015).

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
    processing circuitry;
    a containerized application;
    a physical interface;
    a data plane development kit (DPDK)-based virtual router configured to execute on the processing circuitry to send and receive packets via the physical interface; and
    a kernel network stack configured to execute on the processing circuitry to perform tunneling processing for packets destined to the containerized application and received by the DPDK-based virtual router via the physical interface.

2. The system of claim 1, wherein the kernel network stack is further configured to perform tunnel processing for packets sourced by the containerized application and sent by the DPDK-based virtual router via the physical interface.

3. The system of claim 1, wherein the physical interface is included in a plurality of physical interfaces of the system, and wherein each of the plurality of physical interfaces is assigned to the DPDK-based virtual router.

4. The system of claim 3,
    wherein the plurality of physical interfaces comprises one or more ports,
    wherein for each port of the plurality of physical interfaces, a corresponding vhost interface is configured between the DPDK-based virtual router and the kernel network stack.

5. The system of claim 4, wherein the DPDK-based virtual router is configured to, for a packet received via a vhost interface, send the packet via the port corresponding to the vhost interface.

6. The system of claim 4, wherein the DPDK-based virtual router is configured, for a packet received via a port of the one or more ports, send the packet to the kernel network stack via the vhost interface corresponding to the port.

7. The system of claim 1, wherein the DPDK-based virtual router is configured to determine whether to send an inbound packet to the kernel network stack for the tunneling processing based on an encapsulation type of the inbound packet.

8. The system of claim 1, wherein the DPDK-based virtual router is configured to determine whether to send an inbound packet to the kernel network stack for the tunneling processing based on a label of the inbound packet.

9. The system of claim 1, wherein the DPDK-based virtual router is configured to determine whether to send an inbound packet to the kernel network stack for the tunneling processing based on a determination that the DPDK-based virtual router is unable to process the inbound packet.

10. The system of claim 1, wherein the DPDK-based virtual router is configured to determine whether to send an inbound packet to the kernel network stack for the tunneling processing based on routing information in a routing table of the DPDK-based virtual router.

11. A method comprising:
    receiving, from a physical interface by a data plane development kit (DPDK)-based virtual router executed by processing circuitry, a first packet destined for a containerized application;

determining, by the DPDK-based virtual router whether a kernel network stack executed by the processing circuitry is to perform tunneling processing for the first packet; and in response to determining that the kernel network stack is to perform tunneling processing for the first packet, forwarding, by the DPDK-based virtual router, the first packet to the kernel network stack.

12. The method of claim 11, wherein the method further comprises:

receiving, by the kernel network stack, a second packet from the containerized application;

performing, by the kernel network stack, tunneling processing for the second packet;

forwarding, by the kernel network stack, the processed second packet to the DPDK-based virtual router; and sending, by the DPDK-based virtual router, the processed second packet via the physical interface to a destination network device.

13. The method of claim 11, wherein the physical interface is included in a plurality of physical interfaces, and wherein each of the plurality of physical interfaces is assigned to the DPDK-based virtual router.

14. The method of claim 13, wherein the plurality of physical interfaces comprises one or more ports, further comprising configuring, for each port of the plurality of physical interfaces, a corresponding vhost interface between the DPDK-based virtual router and the kernel network stack.

15. The method of claim 14, further comprising:

receiving, by the DPDK-based virtual router from the kernel network stack, a third packet via a vhost interface of the corresponding vhost interfaces; and sending, by the DPDK-based virtual router, the third packet via the port corresponding to the vhost interface.

16. The method of claim 14, further comprising:

receiving, by the DPDK-based virtual router, a third packet via a port of the plurality of ports; and sending, by the DPDK-based virtual router, the third packet to the kernel network stack via the vhost interface corresponding to the port.

17. The method of claim 11, wherein determining whether the kernel network stack is to perform tunneling processing for the first packet comprises determining whether the kernel network stack is to perform tunneling processing based on one or more of an encapsulation type of the first packet, a label of the first packet, or a routing table.

18. The method of claim 11, wherein determining whether the kernel network stack is to perform tunneling processing for the first packet comprises determining whether the kernel network stack is to perform tunneling processing based on determining, by the DPDK-based virtual router, that the DPDK-based virtual router is unable to process the first packet.

19. A non-transitory computer-readable medium having computer-executable instructions, that when executed, cause one or more processors that execute a DPDK-based virtual router to perform operations comprising:

receive a first packet destined for a containerized application;

determine whether a kernel network stack executed by the one or more processors is to perform tunneling processing for the first packet; and in response to a determination that the kernel network stack is to perform tunneling processing for the first packet, forward the first packet to the kernel network stack.

20. The non-transitory computer-readable medium of claim 19, wherein the instructions further cause the one or more processors to perform operations comprising:

receive from the kernel network stack, a second packet sent to the kernel network stack from the containerized application for tunneling processing; and send the processed second packet via a physical interface to a destination network device.

* * * * *